(12) United States Patent
Ward et al.

(10) Patent No.: US 11,040,828 B1
(45) Date of Patent: Jun. 22, 2021

(54) MODULAR TRANSFER UNITS FOR DELIVERING ITEMS

(71) Applicant: Amazon Technologies, Inc., Seattle, WA (US)

(72) Inventors: Suzanne Clark Ward, Santa Monica, CA (US); Shelby Frances Apps, Atlanta, GA (US); William Patrick Apps, Johns Creek, GA (US); Jessica Fitzgerald, Moorestown, NJ (US); Derick Foster, Sugar Hill, GA (US); Philip Andrew King, Sugar Hill, GA (US); Daniel Lowther, Washington Crossing, PA (US); Kaushal Bharatkumar Mehta, Seattle, WA (US); Prasad V. Rao, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 287 days.

(21) Appl. No.: 16/159,377

(22) Filed: Oct. 12, 2018

Related U.S. Application Data

(60) Provisional application No. 62/572,036, filed on Oct. 13, 2017.

(51) Int. Cl.
  *B65G 1/137* (2006.01)
  *G01C 21/20* (2006.01)
  (Continued)

(52) U.S. Cl.
  CPC ............... *B65G 1/137* (2013.01); *B60P 1/04* (2013.01); *G01C 21/20* (2013.01); *G05D 1/0212* (2013.01);
  (Continued)

(58) Field of Classification Search
  CPC ...... B65G 1/137; G01C 21/20; G05D 1/0212; G05D 2201/0213; G06Q 10/08355; B60P 1/04; B61B 1/00
  See application file for complete search history.

(56) References Cited

U.S. PATENT DOCUMENTS 9,519,882 B2 *  12/2016  Galluzzo .............. B65G 1/1373
10,303,171 B1 *  5/2019  Brady .................... G08G 1/207
(Continued)

OTHER PUBLICATIONS

Wikipedia.com, "Unit load device," printed Oct. 11, 2018 (last edited Sep. 1, 2018), available at https://en.wikipedia.org/wiki/Unit_load_device, 11 pages.

*Primary Examiner* — Michael Collins
(74) *Attorney, Agent, or Firm* — Athorus, PLLC

(57) ABSTRACT

Modular transfer units are configured to transport bins or other storage units of standard shapes and sizes between locations. The modular transfer units may be loaded with bins or other storage units having items disposed therein at origins of the items, or at locations where the items are stored, such as fulfillment centers. The modular transfer units may then be mounted to one or more vehicles, such as trailers or rail cars, and transported to another location, where the modular transfer units may be removed from the vehicle, or transferred to another vehicle. The bins or other storage units may be loaded with items that are intended for delivery to a common location. After a bin or storage unit has been unloaded from a modular transfer unit, one or more other bins or storage units may be loaded thereon.

13 Claims, 27 Drawing Sheets

(51) Int. Cl.
*G05D 1/02* (2020.01)
*G06Q 10/08* (2012.01)
*B60P 1/04* (2006.01)
*B61B 1/00* (2006.01)

(52) U.S. Cl.
CPC .......... *G06Q 10/08355* (2013.01); *B61B 1/00* (2013.01); *G05D 2201/0213* (2013.01)

(56) References Cited

U.S. PATENT DOCUMENTS

| | | |
|---|---|---|
| 10,577,199 B2* | 3/2020 | Lee ................ A47L 9/009 |
| 10,793,357 B2* | 10/2020 | Johnson ................ G06Q 10/08 |
| 10,875,174 B2* | 12/2020 | Skaaksrud .......... G05D 1/0291 |
| 2003/0106895 A1 | 6/2003 | Kalal |
| 2006/0024150 A1* | 2/2006 | Gregory ............... B65F 1/1473 414/495 |
| 2011/0272419 A1 | 11/2011 | Vanderberg et al. |
| 2012/0152877 A1* | 6/2012 | Tadayon ............... F24S 25/10 212/224 |
| 2015/0006005 A1* | 1/2015 | Yu ............... G06Q 50/28 701/22 |
| 2015/0088620 A1 | 3/2015 | Wittek |
| 2015/0378359 A1* | 12/2015 | Bonefas ............... G06T 7/20 701/41 |
| 2016/0145044 A1* | 5/2016 | Mountz ............... B65G 1/1373 700/216 |
| 2016/0145045 A1* | 5/2016 | Mountz ............... B65G 1/137 700/216 |
| 2016/0304244 A1 | 10/2016 | Nankervis |

* cited by examiner

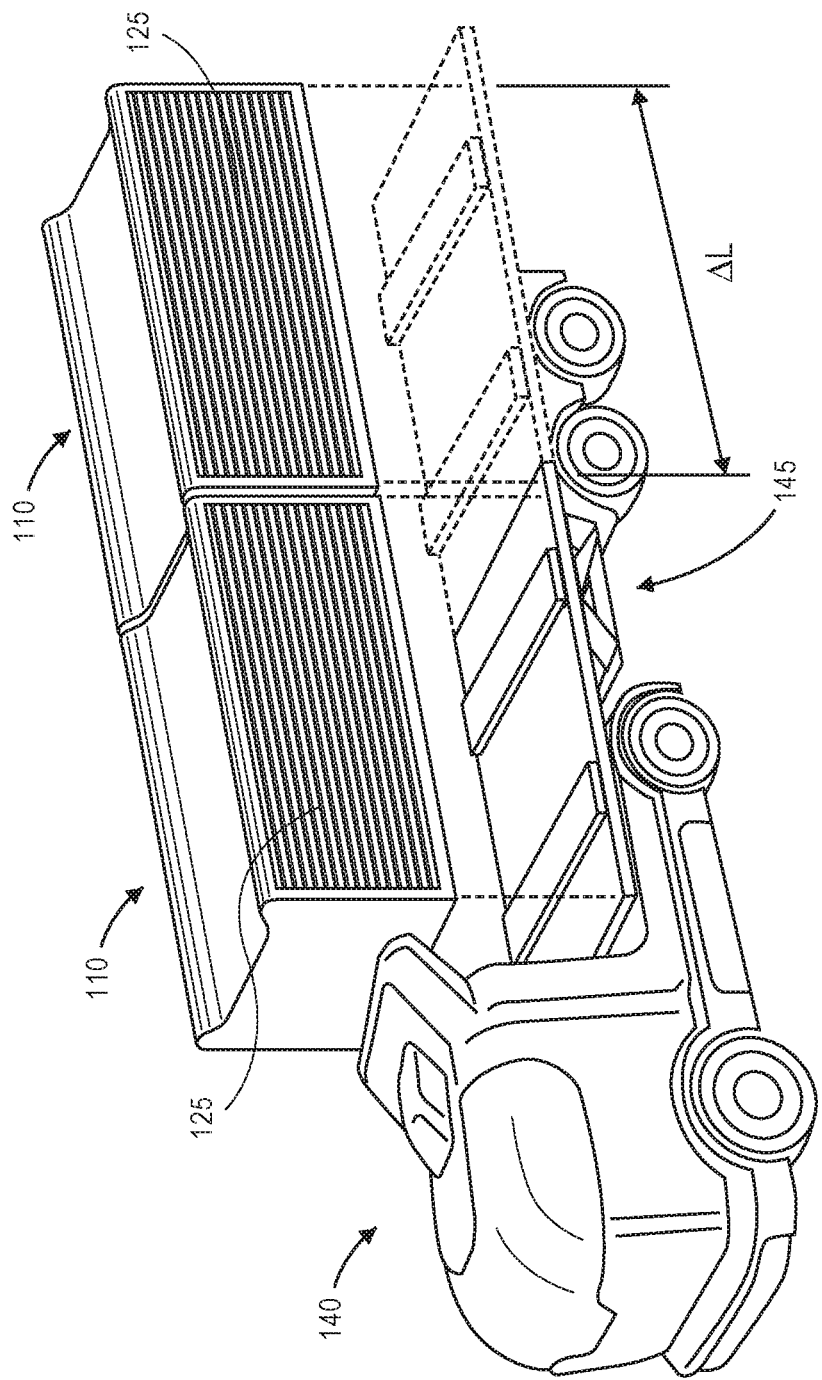

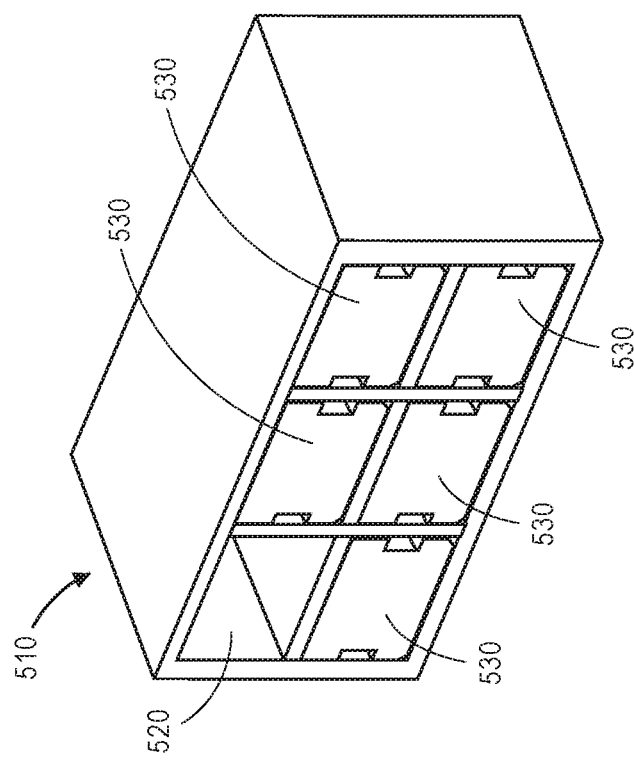
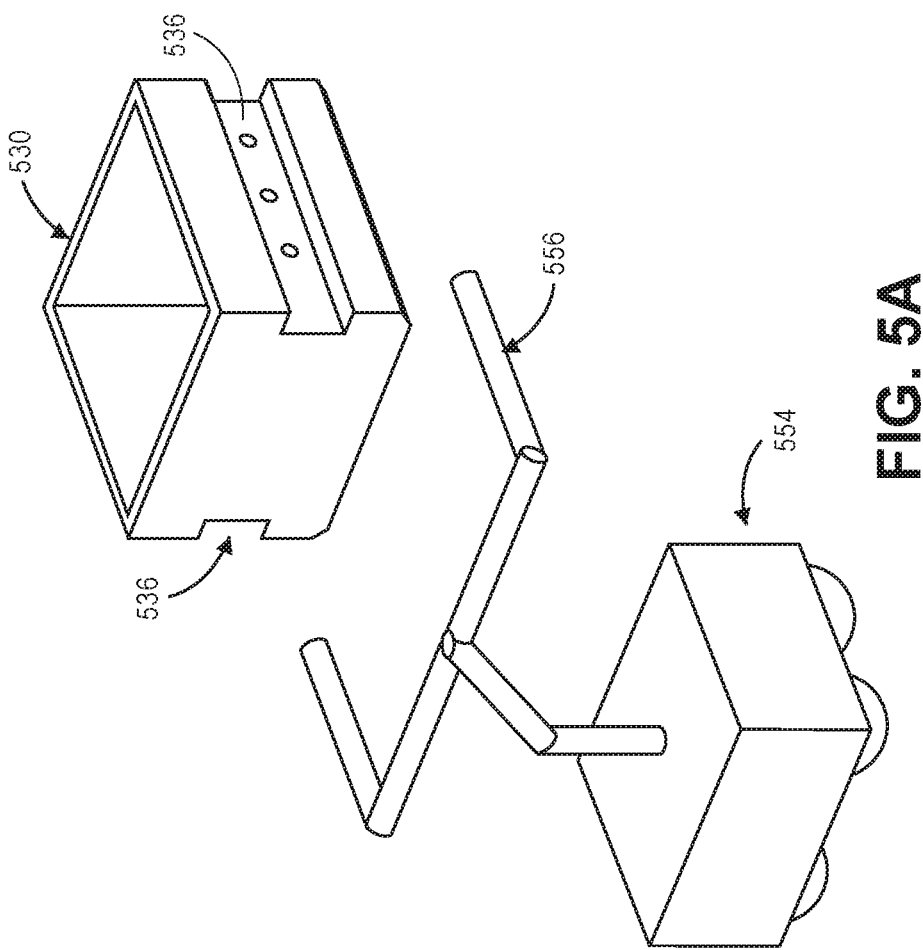
FIG. 5B
FIG. 5A

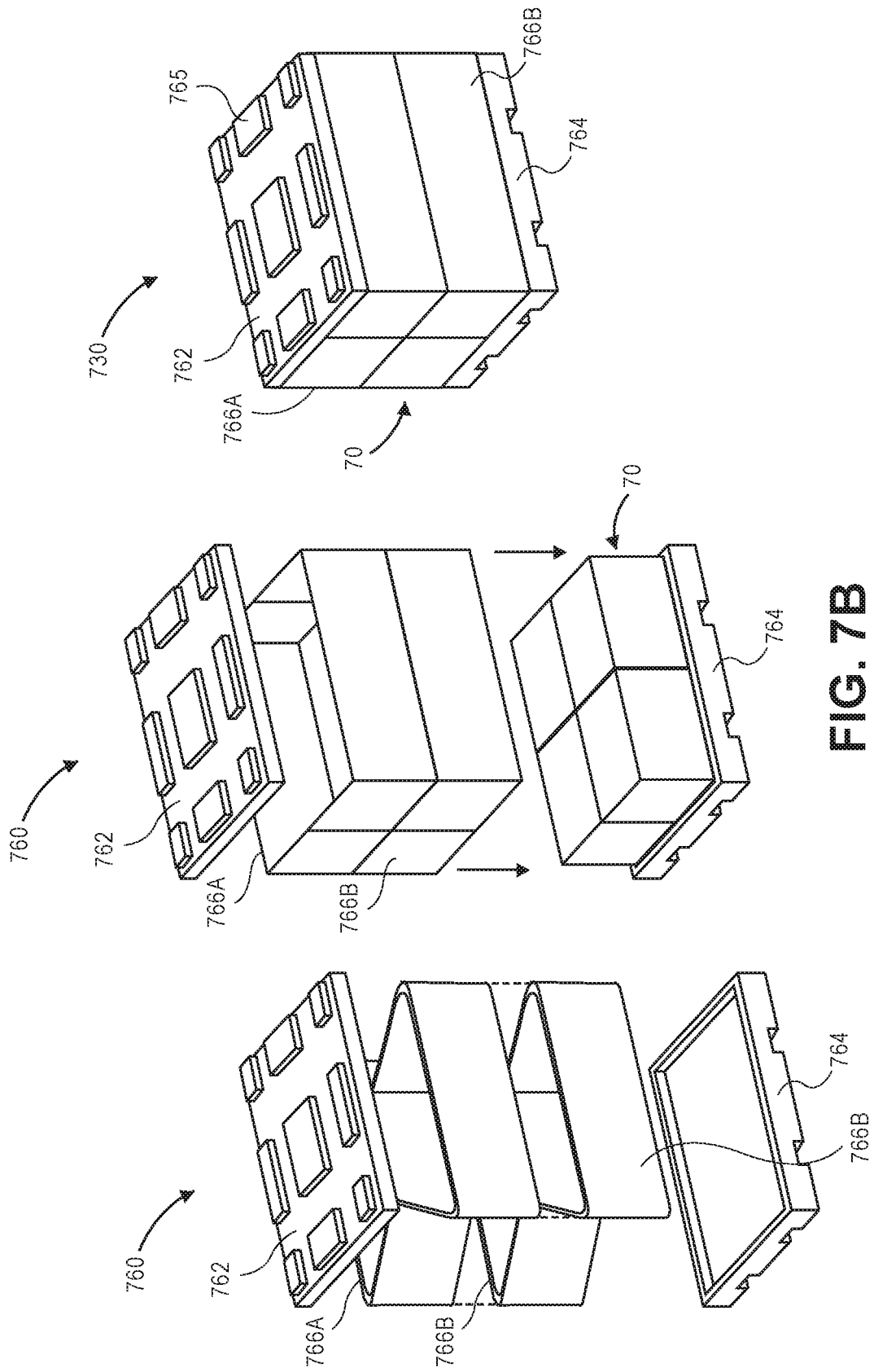

MODULAR TRANSFER UNITS FOR DELIVERING ITEMS

CROSS-REFERENCE TO RELATED APPLICATIONS

This application claims priority to U.S. Patent Application No. 62/572,036, filed Oct. 13, 2017, the contents of which are incorporated by reference herein in their entirety.

BACKGROUND

A fulfillment center is a facility, a warehouse or another like structure that is constructed in a distributed, centralized location and adapted to receive items from sources of the items (e.g., vendors or other fulfillment centers). Fulfillment centers may include stations for receiving shipments of items from various sources, for storing such items upon their arrival, and/or for preparing such items for delivery to customers. When an order for the purchase of one or more items that are stored in a fulfillment center is received from a customer, the ordered items are typically retrieved from the spaces or areas in which such items are stored, and prepared for delivery to the customer, e.g., by packing the ordered items into one or more appropriate containers with a sufficient type and amount of dunnage, and delivering the containers to a destination designated by the customer.

As electronic commerce expands into ever more sectors of the economy, customers have become accustomed to, and are increasingly demanding, greater product availability and faster response times from online marketplaces. Shortening an elapsed time between the placement of an order for an item and a delivery of the item remains a primary goal of retailers that engage in electronic commerce, in order to obtain, retain or expand competitive advantages over their bricks-and-mortar counterparts. Improvements to any aspect of a supply chain may result in a shortened time of delivery, thereby providing substantial benefits to such retailers, and to customers who order items from them.

BRIEF DESCRIPTION OF THE DRAWINGS

FIGS. 5A through 5D are views of aspects of one system for delivering items using modular transfer units in accordance with embodiments of the present disclosure.

FIGS. 7A through 7C are views of aspects of one system for delivering items using modular transfer units in accordance with embodiments of the present disclosure.

DETAILED DESCRIPTION

As is set forth in greater detail below, the present disclosure is directed to modular transfer units, or the use of modular transfer units, for the delivery of items between two or more locations, such as between one or more sources of such items and one or more destinations specified by customers.

The modular transfer units may be constructed in a durable manner and configured for ready loading or installation onto vehicles of various types that may be configured for transportation by various public or private channels or ways. For example, the modular transfer units may be configured to receive bins or other storage units of standard sizes and shapes, which may be partially or completely filled with items at their respective origins, or at a fulfillment center or other like station or facility, and loaded or installed onto a modular transfer unit. Additionally, one or more of the modular transfer units of the present disclosure may be transported to locations where the items loaded thereon are desired by customers, and loaded with one or more of such bins or storage units, the mobile transfer unit may be loaded or installed onto one or more carrying vehicles, such as trailers or rail cars, and transported to one or more destinations associated with the items within the bins or other storage units. Upon arriving at a selected location, a modular transfer unit may be unloaded from a vehicle, or transferred to another vehicle for transportation to a different destination. Bins or other storage units containing items that are desired at a destination may be removed, and other bins or storage units that are empty or which are partially or completely filled with other items may be loaded or installed thereon for transportation to another location.

Accordingly, the modular transfer units of the present disclosure may be used to efficiently and effectively transfer items in large numbers from one or more sources, such as a fulfillment center, to one or more destinations, such as areas or regions where the items are desired singly or in bulk, by way of one or more delivery vehicles, thereby enabling the items to be delivered by humans or machines to such destinations more rapidly and efficiently than existing systems or methods for fulfillment and delivery.

Figure 1B:
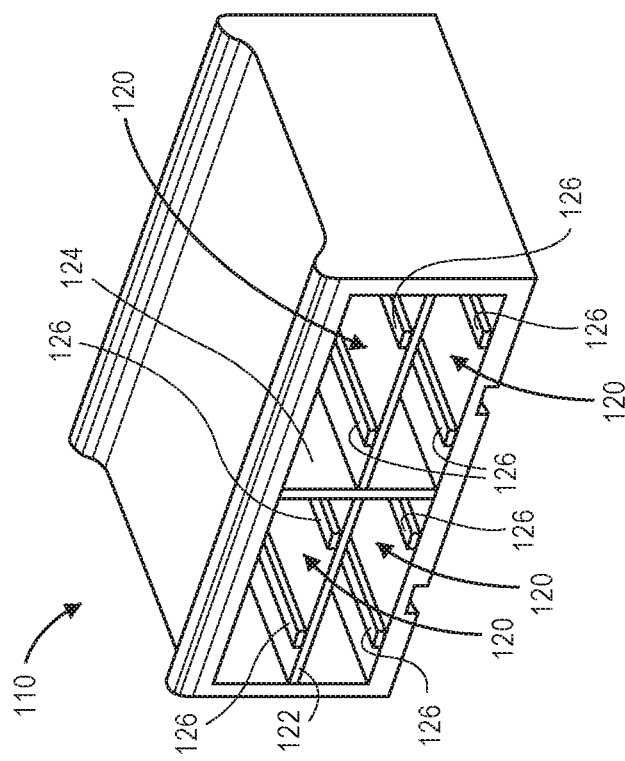
FIGS. 1A through 1P are views of aspects of one system for delivering items using modular transfer units in accordance with embodiments of the present disclosure.
Figure 1A:
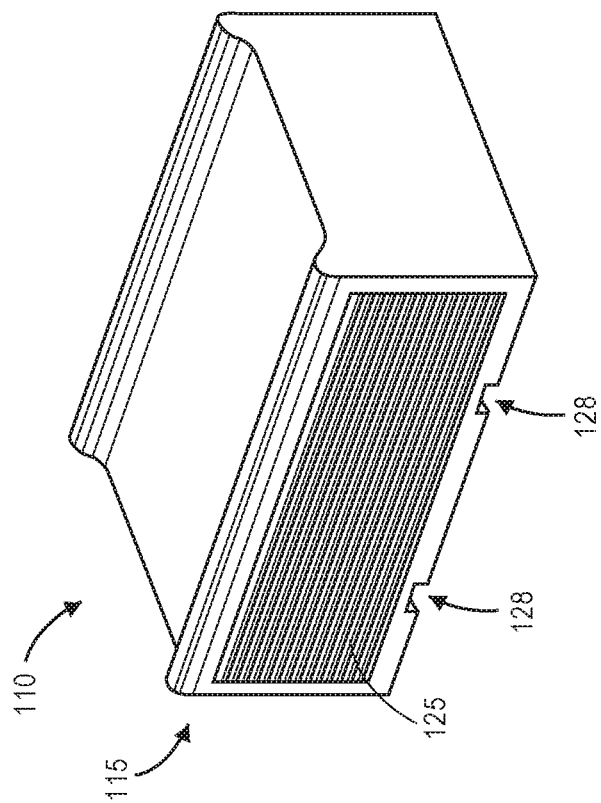
Figure 1C:
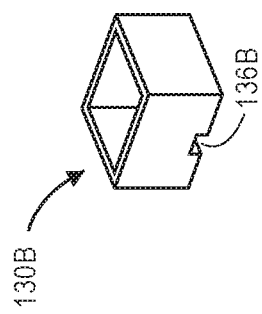
Figure 1D:
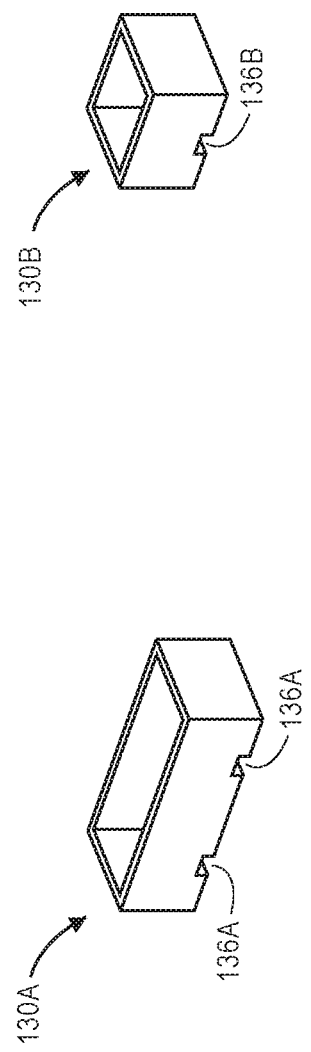
Figure 1E:
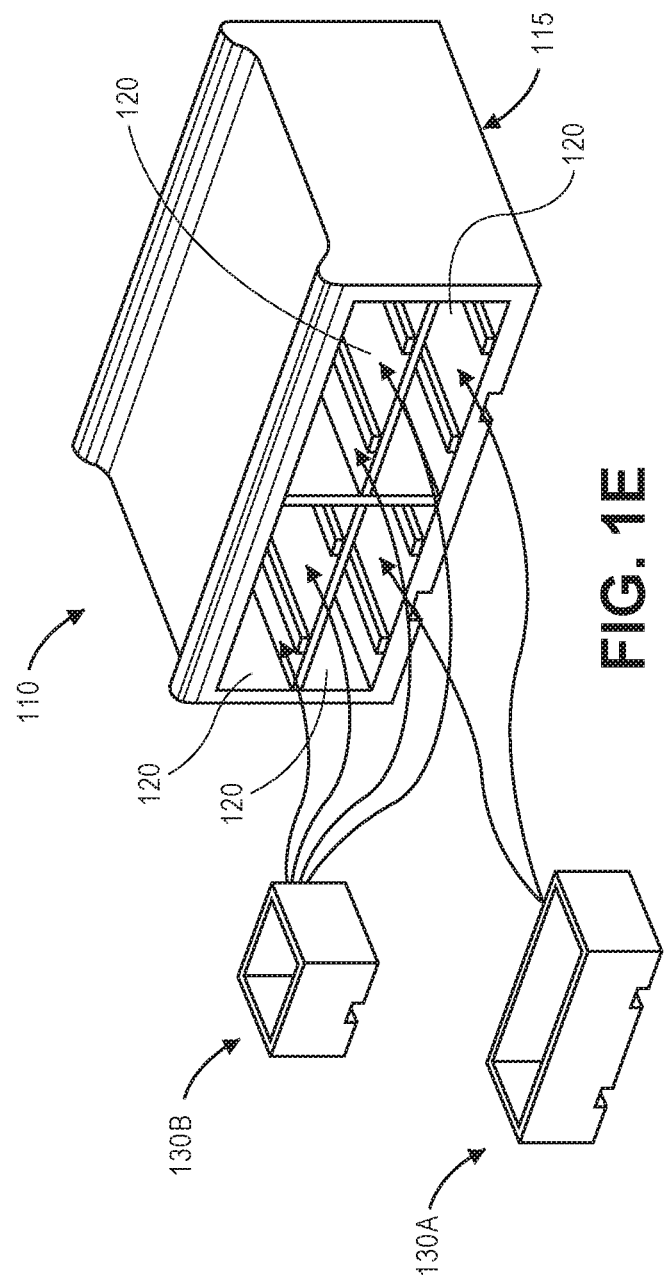
Figure 1G:
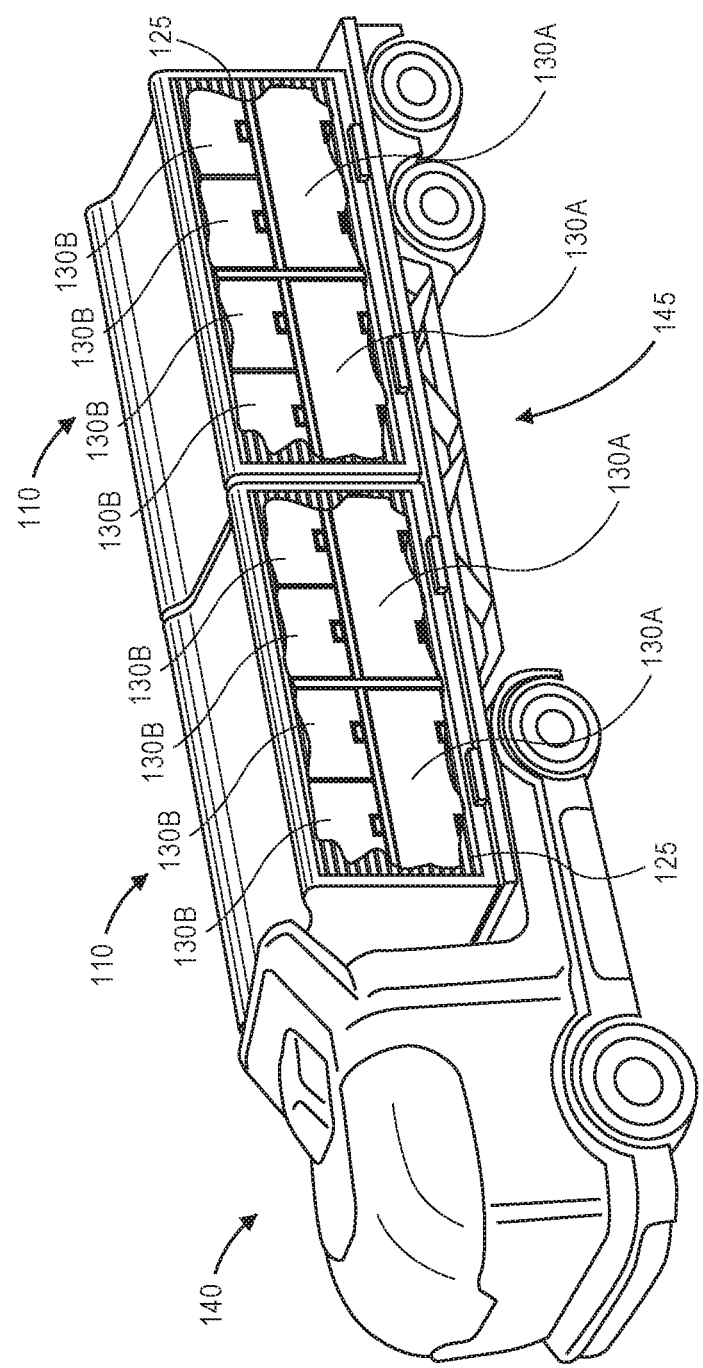
Figure 1I:
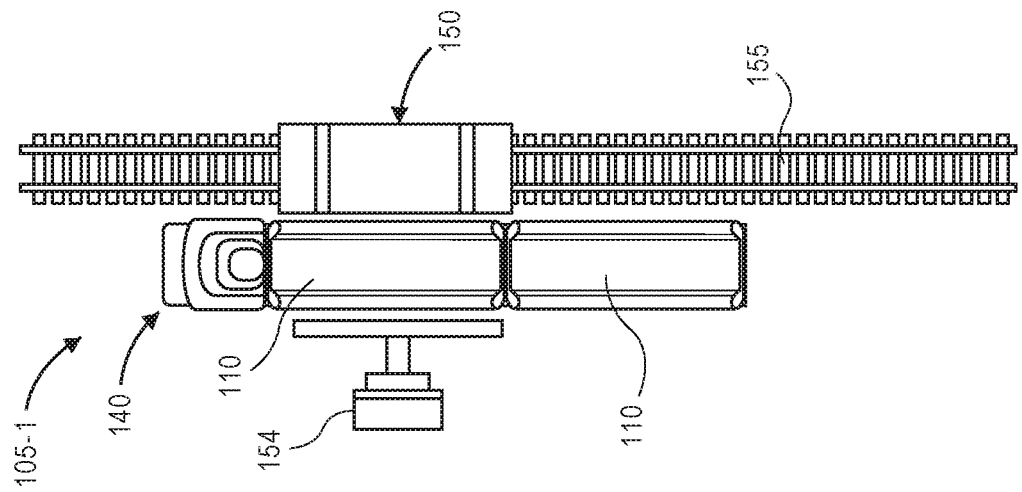
Figure 1H:
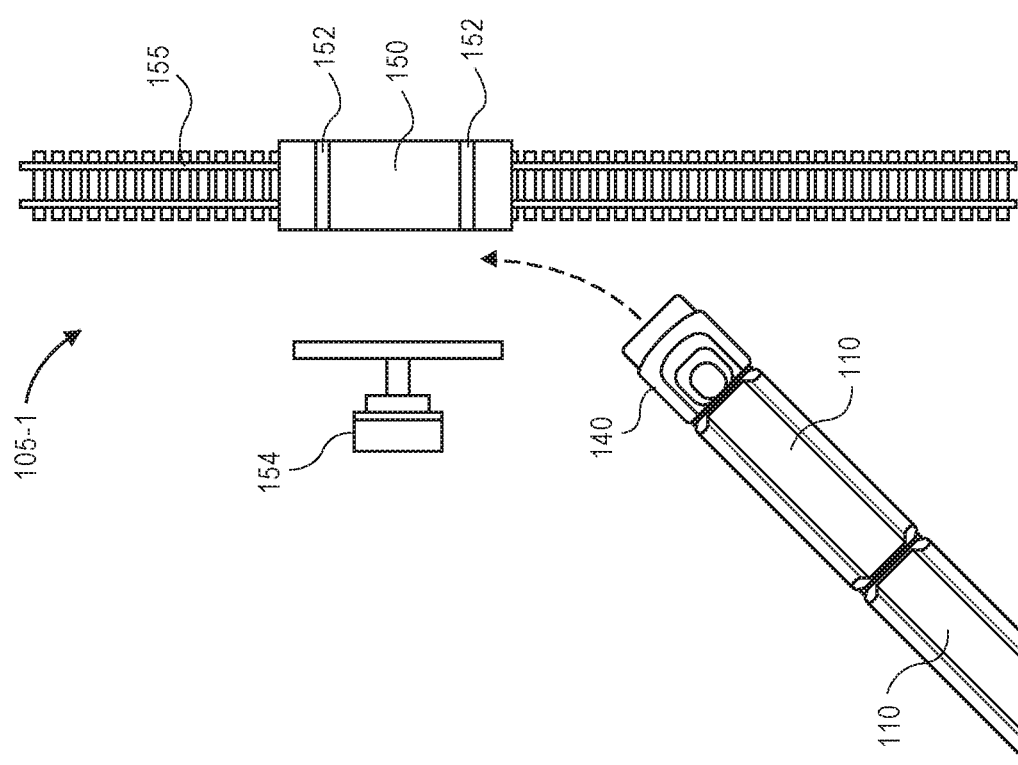
Figure 1J:
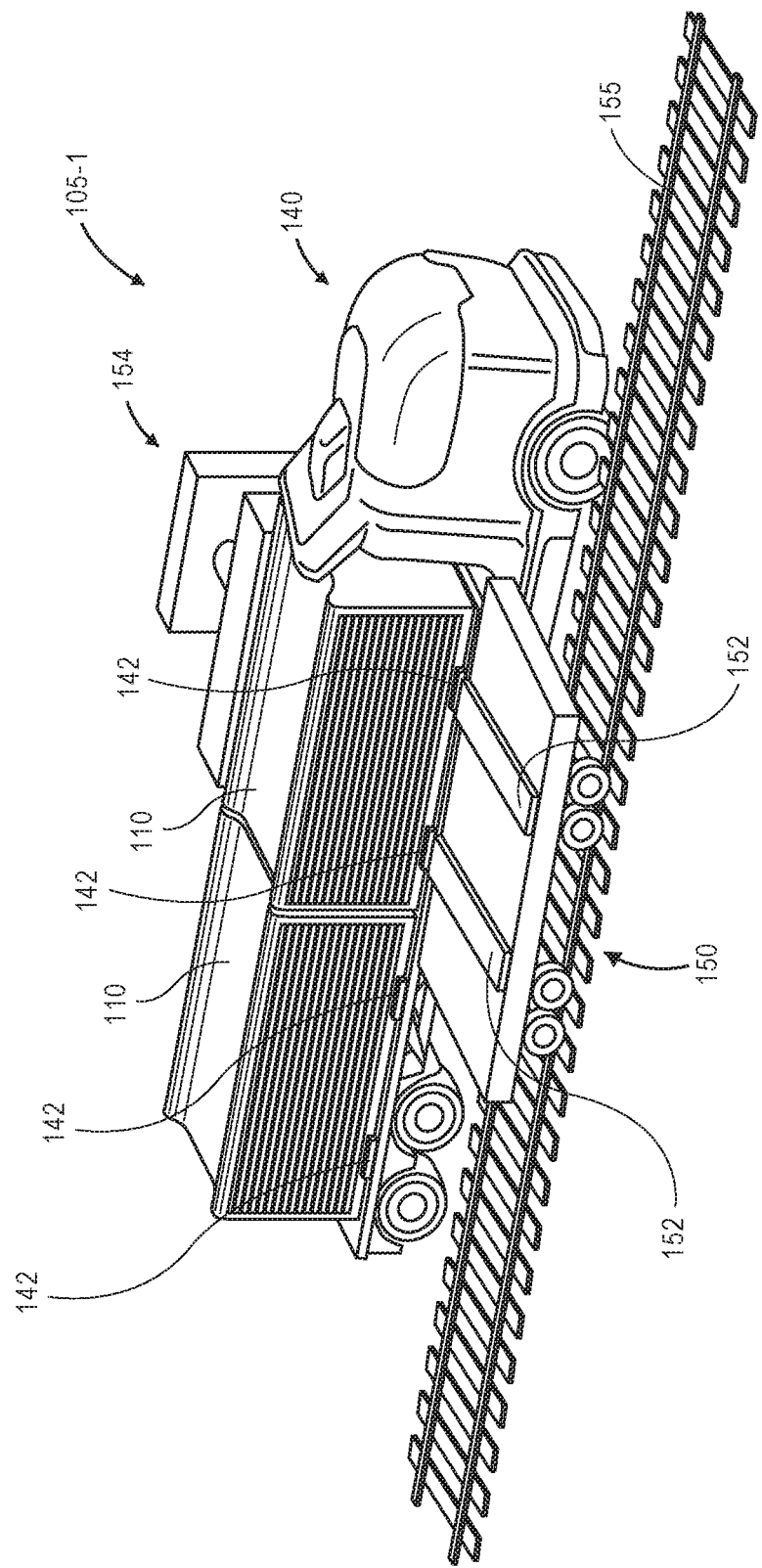
Figure 1K:
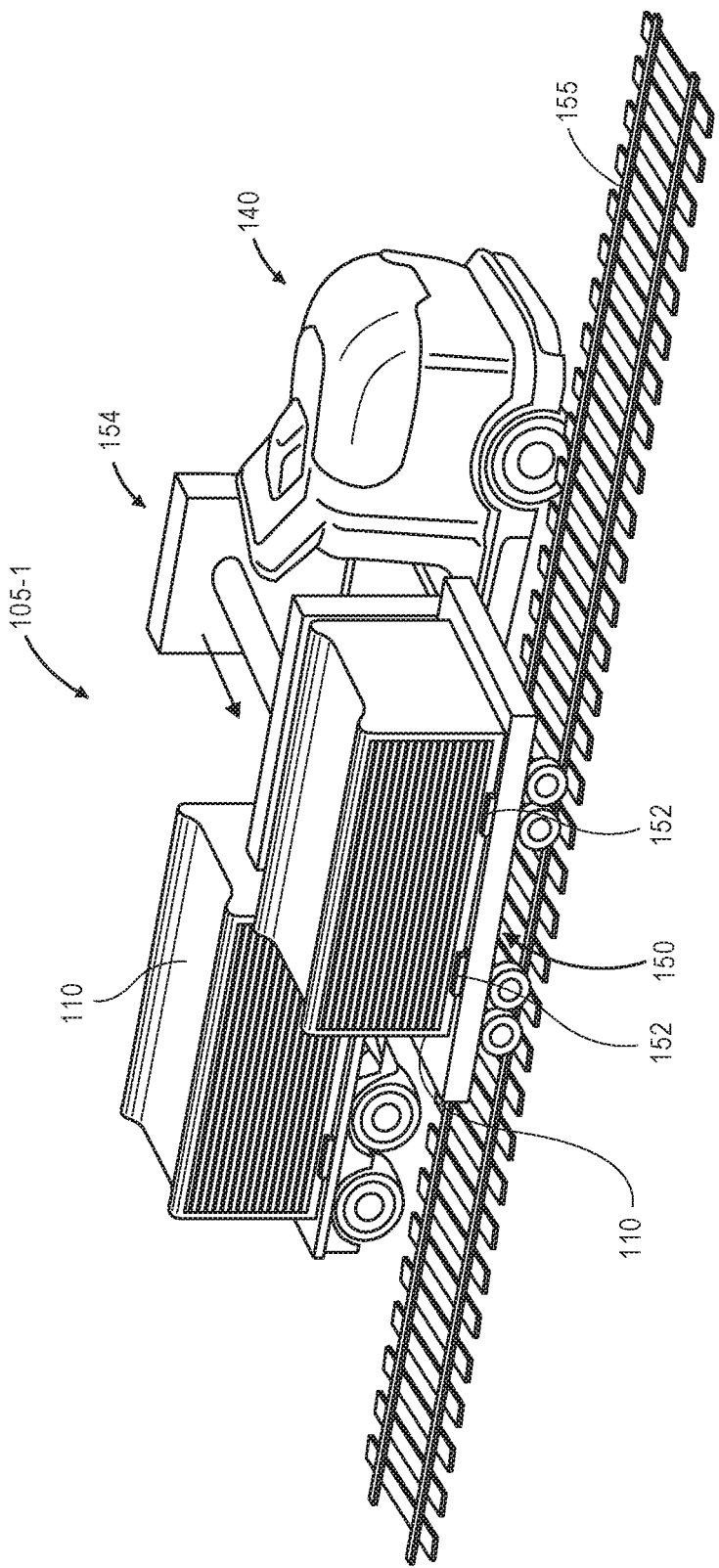
Figure 1L:
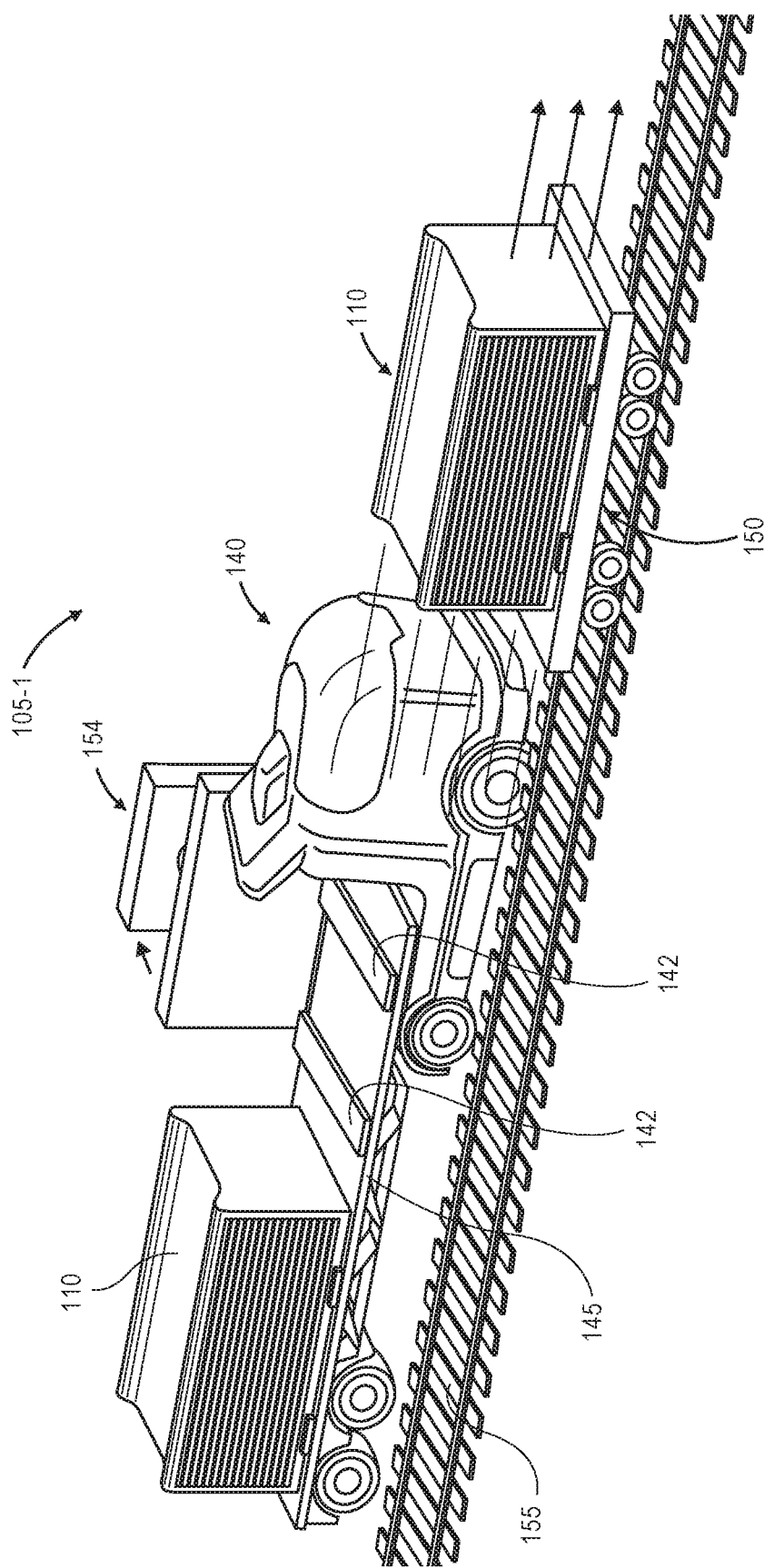
Figure 1N:
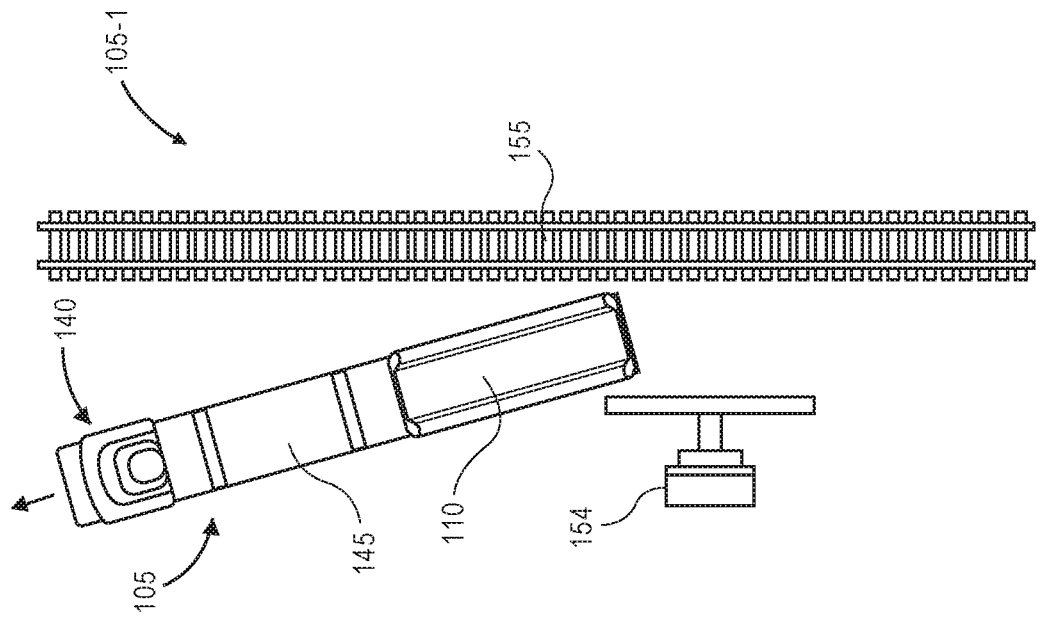
Figure 1M:
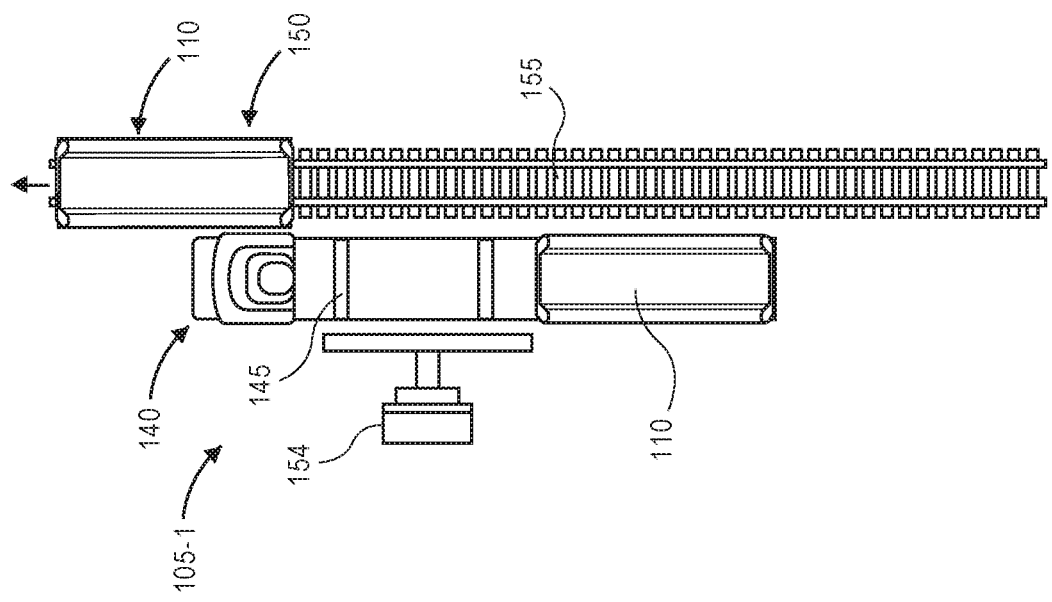
Figure 10:
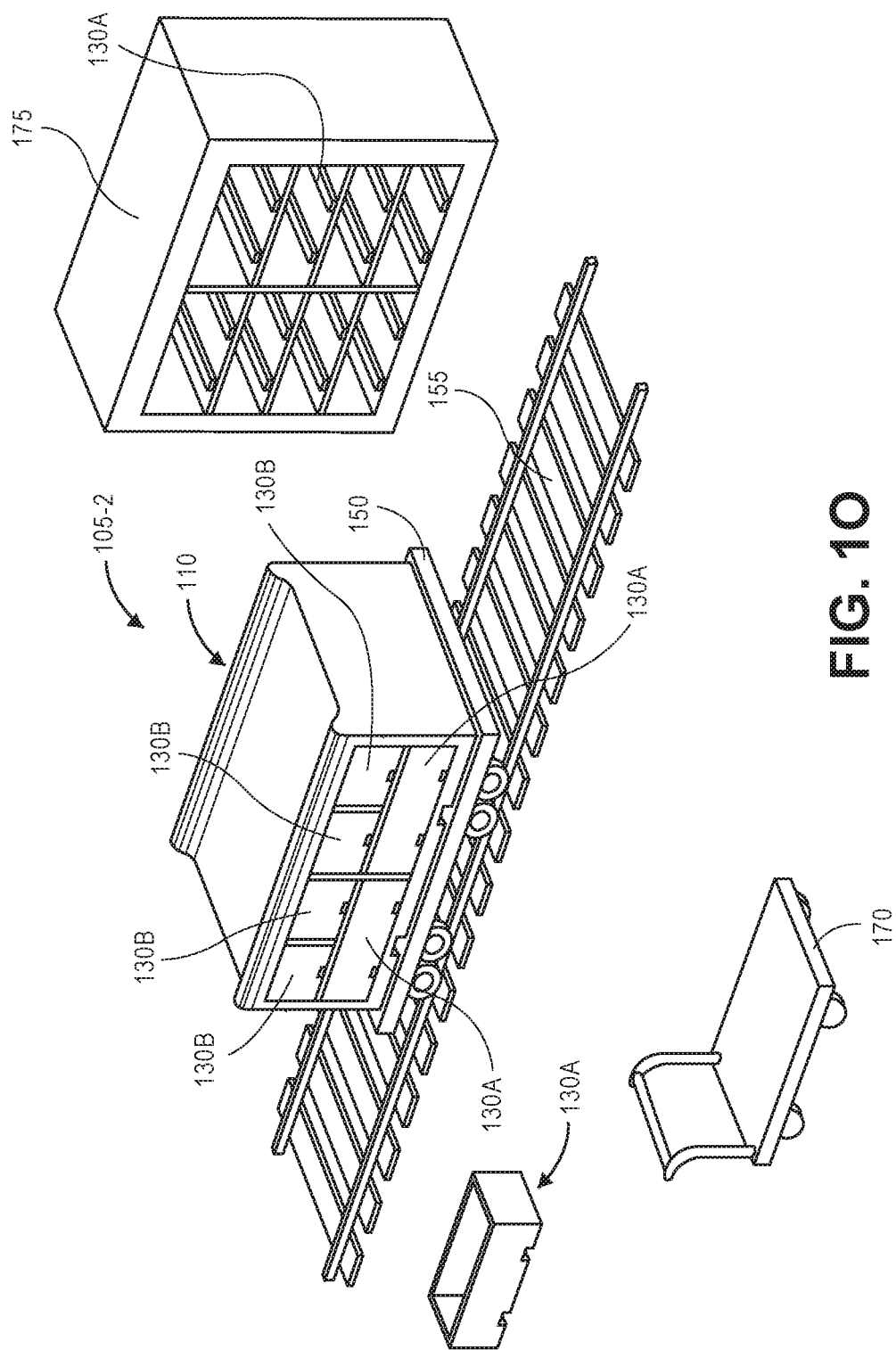
Figure 1P:
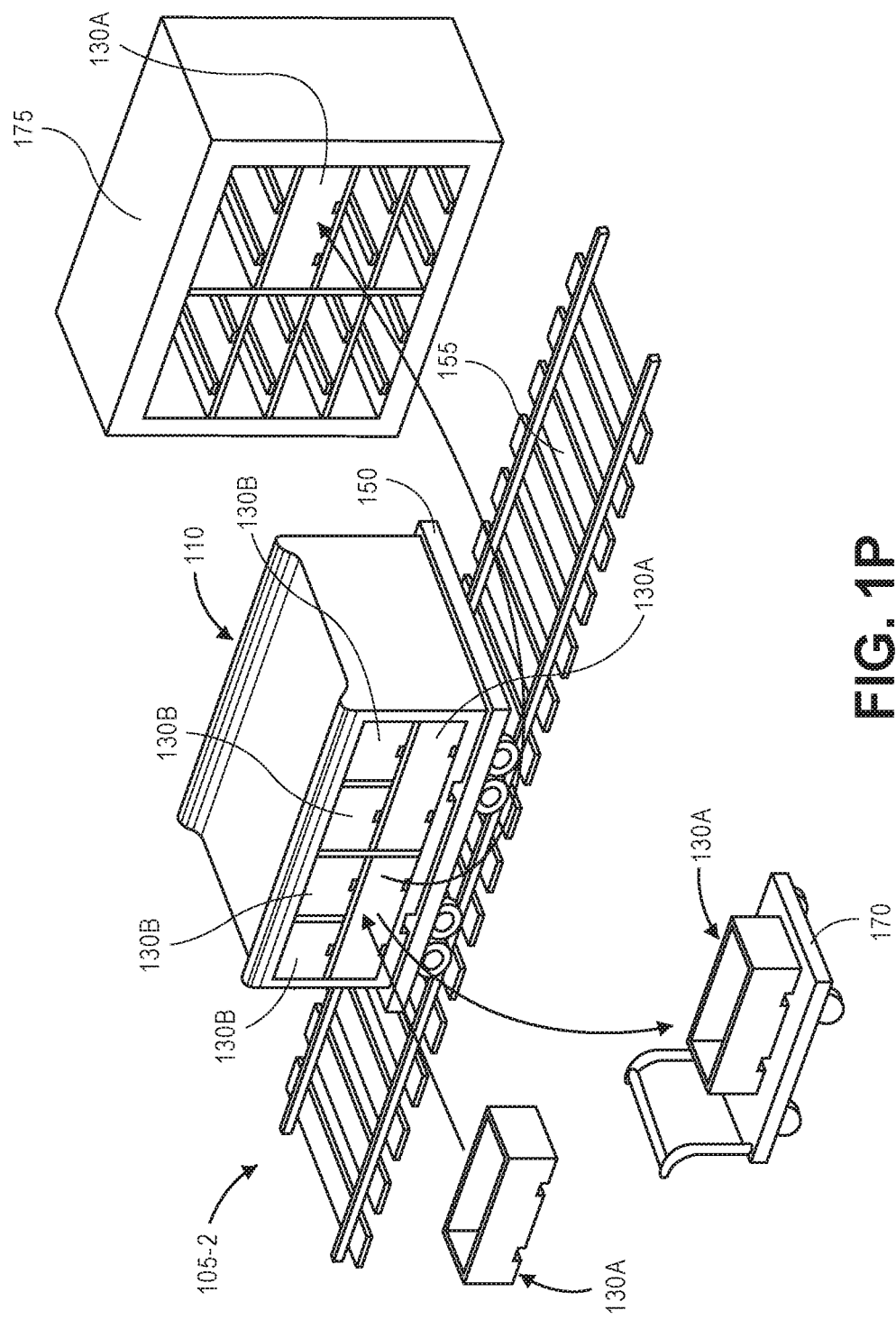

Referring to FIGS. 1A through 1P, views of aspects of one system for delivering items using modular transfer units in accordance with embodiments of the present disclosure are shown. As is shown in FIGS. 1A and 1B, a modular transfer unit 110 includes a frame 115 having a substantially rectangular shape. The frame 115 includes plurality of openings 120 in a front face (or a first face) of the frame 115, and a roll-up door 125 that is configured to expose or conceal one or more of the openings 120. The openings 120 are defined within the frame by a horizontal member 122 and a vertical member 124. Additionally, as is shown in FIG. 1B, each of the openings 120 includes a pair of guides 126 aligned in parallel with one another. The frame 115 further includes a pair of channels 128 extending in parallel with one another along a bottom surface of the frame 115.

As is shown in FIGS. 1C and 1D, bins 130A, 130B define open cavities having substantially rectangular shapes that are configured to receive one or more items therein. The bins 130A, 130B have frames formed from four side panels and a bottom panel, with cavities that are accessible from above the bins 130A, 130B. The bin 130A of FIG. 1C has dimensions that substantially correspond to the dimensions of each of the openings 120 of the modular transfer unit 110. The bin 130B of FIG. 1D is approximately half the size of the bin 130A of FIG. 1C, such that two of the bin 130B may be accommodated within one of the openings 120 of the modular transfer unit 110 shown in FIG. 1B. The bin 130A of FIG. 1C includes a pair of tracks 136A along a bottom surface of the frame. The dimensions and spacing of the tracks 136A of the bin 130A correspond to the dimensions and spacing of the guides 126 of the openings 120. In some embodiments, the dimensions and spacing of the tracks 136A of the bin 130A may also correspond to the dimensions and spacing of one or more elements for loading the bin 130A into or removing the bin 130A from the modular transfer unit 110, e.g., forks, tines or other components of a forklift or like machine. The bin 130B of FIG. 1D includes a single track 136B along a bottom surface of the frame. The dimensions of the track 136B of the bin 130B corresponds to the dimensions of each of the guides 126 of the openings 120.

The modular transfer unit 110 shown in FIGS. 1A and 1B is configured to receive a plurality of bins or other storage units within the openings 120. As is shown in FIG. 1E, the modular transfer unit 110 may receive two of the bins 130A in two of the openings 120, and four of the bins 130B in two of the openings 120. For example, one of the bins 130A of FIG. 1C may be inserted into any of the openings 120, e.g., by aligning the tracks 136A of the bin 130A with the guides 126 of one of the openings 120, and manually or automatically pushing the bin 130A into the opening 120. Two of the bins 130B of FIG. 1D may be inserted into any of the openings 120, e.g., by aligning the tracks 136B of two of the bins 130B, side-by-side, with the guides 126 of any of the openings 120, and manually or automatically pushing the bins 130B into the opening 120. Alternatively, the modular transfer unit 110 may include any combinations having any numbers of the bins 130A, 130B, or any other bins or other storage units (not shown).

The modular transfer unit 110 may be configured for delivery by one or more transmit modes, e.g., by one or more land, sea or air vehicles. A delivery of the modular transfer unit 110 from one location to another may constitute an entire route for a delivery of items within the bins 130A, 130B, or one or more paths of such a route.

As is shown in FIG. 1F, a road tractor 140 is coupled to a trailer 145. The road tractor 140 may be configured for operation by one or more humans, or for autonomous operation, e.g., by programming the road tractor 140 to engage with the trailer 145 and/or one or more of the modular transfer units 110, or to transport the modular transfer units 110 to one or more selected locations.

The trailer 145 of FIG. 1F has an adjustable length, e.g., a length that may be extended or contracted. For example, the trailer 145 may include one or more beams or support structures that are configured for extension along a range of lengths. As is shown in FIG. 1F, the trailer 145 is configured to receive one of the modular transfer units 110 thereon, and may be extended by a desired length ΔL to receive two of the modular transfer units 110 thereon. Alternatively, the trailer 145 may be extended or contracted by any other extent in order to accommodate any number of modular transfer units 110 (e.g., one or three or more) or any other objects thereon.

As is shown in FIG. 1G, the two of the modular transfer units 110 are installed on the trailer 145, with front faces of the modular transfer units 110 having the openings 120 disposed therein being oriented laterally or perpendicularly with respect to a forward orientation or a direction of travel of the trailer 145.

As is shown in FIG. 1G, a road tractor 140 is coupled to a trailer 145, and two of the modular transfer units 110 are installed on the trailer 145, with front faces of the modular transfer units 110 having the openings 120 disposed therein being oriented laterally or perpendicularly with respect to a forward orientation or a direction of travel of the trailer 145. Additionally, the trailer 145 includes pairs of guides 142 that are aligned laterally or perpendicularly with respect to a forward orientation or a direction of travel of the trailer 145. The dimensions and spacing of the guides 142 of the trailer 145 correspond to the dimensions and spacing of the tracks 128 of the modular transfer units 110. The road tractor 140 may be configured for operation by one or more humans, or for autonomous operation, e.g., by programming the road tractor 140 to engage with the trailer 145 and/or one or more of the modular transfer units 110, or to transport the modular transfer units 110 to one or more selected locations.

Each of the modular transfer units 110 shown in FIG. 1G includes one or more of the bins 130A or the bins 130B. Although the trailer 145 includes a pair of the modular transfer units 110, those of ordinary skill in the pertinent arts will recognize that the trailer 145 or any other vehicle may transport or carry any number of the modular transfer units 110, or any other modular transfer units, in accordance with the present disclosure.

Modular transfer units of the present disclosure may be loaded or unloaded at any type or form of station so configured, manually or by one or more automated systems. In some embodiments, a modular transfer unit may be transferred from one vehicle or system to another vehicle or system at a station that may be selected in accordance with an optimal path or optimal route. As is shown in FIGS. 1H and 1I, the road tractor 140 pulls the trailer 145 and the modular transfer units 110 thereon to a station 105-1 having a flat car 150 (or other rail-based vehicle) and a diverter unit 154. The flat car 150 includes a pair of guides 152 and is on a set of rails 155. The dimensions and spacing of the guides 152 of the flat car 150 correspond to the dimensions and spacing of the tracks 128 of the modular transfer units 110. Alternatively, the flat car 150 or another vehicle may include one or more rollers or other systems enabling a modular transfer unit to be received thereon or discharged therefrom, as well as one or more latches or other locking devices or systems for fixing the modular transfer unit 110 atop the flat car 150 during transit. The diverter unit 154 may be a pusher diverter unit or other system configured to apply pressure to objects on one side of a vehicle, viz., one of the modular transfer units 110 on the trailer 145, in order to discharge the objects from another side of the vehicle, e.g., to the flat car 150 on the set of rails 155. In some embodiments, the diverter unit 154 may be configured to push one or more objects, e.g., one or more of the modular transfer units 110, in a single direction, such as from one vehicle to another vehicle. In some embodiments, the diverter unit 154 may be configured to pull one or more objects, e.g., one or more of the modular transfer units 110, in a single direction, such as from one vehicle to another vehicle. In still other embodiments, the diverter unit 154 may be configured to push or pull one or more objects, e.g., one or more of the modular transfer units 110, in one or more directions.

In accordance with the present disclosure, a diverter unit, such as the diverter unit 154, may operate in any other manner in accordance with the present disclosure to load modular transfer units onto a flat car or other vehicle, or to remove the modular transfer units from the flat car or other vehicle. For example, in some embodiments, modular transfer units may be loaded onto vehicles or removed from vehicles using one or more conveyors or elevating systems that are configured to properly align the modular transfer units with such vehicles and to transfer the modular transfer units to such vehicles or receive the modular transfer units from such vehicles. Moreover, in some embodiments, diverter units, such as the diverter unit 154, that are appropriately sized and configured may also be utilized to load bins, e.g., the bins 130A, 130B, into the modular transfer units 110 or to remove bins from the modular transfer units 110.

As is shown in FIG. 1J, the road tractor 140 and/or the flat car 150 may be manually or automatically controlled at the station 105-1 to place the tractor 145 or one of the modular transfer units 110 in alignment between the diverter unit 154 and the flat car 150. For example, as is shown in FIG. 1J, the flat car 150 may be repositioned with respect to the trailer 145 and/or one of the modular transfer units 110 to co-align the guides 152 of the flat car 150 with the guides 142 of the trailer 145, having one of the modular transfer units 110 thereon. As is shown in FIG. 1K, with the guides 152 of the flat car 150 with the guides 142 of the trailer 145, the diverter unit 154 extends a pusher or other implement to contact a rear face (or a second face) of one of the modular transfer units 110, in order to cause the one of the modular transfer units 110 to be discharged onto the flat car 150. As is shown in FIGS. 1L and 1M, the flat car 150 departs the station 105-1 with the one of the modular transfer units 110 placed thereon, e.g., by way of one or more powered movers (not shown), such as locomotives or other vehicles. Alternatively, the flat car 150 may include one or more motors, engines or other prime movers for transporting the modular transfer unit 110 thereon to one or more other stations.

As is shown in FIG. 1N, the road tractor 140 pulls away from the station 105-1 with a single modular transfer unit 110 on the trailer 145. The road tractor 140 may then be manually or automatically controlled to travel to another station where the remaining modular transfer unit 110 thereon may be discharged from the trailer 145, or where another modular transfer unit 110 may be loaded onto the trailer 145.

Thereafter, the flat car 150 may be transported to another station, e.g., by the set of rails 155, where the one or more bins 130A, 130B may be unloaded therefrom, e.g., onto a hand truck 170 or into a storage facility 175, e.g., a set of shelves. As is shown in FIG. 1O, the flat car 150 arrives at a station 105-2, where one or more other bins 130A are available. The delivery of the one or more bins 130A, 130B from the station 105-1 to the station 105-2 may be the extent of the desired transportation of the items within such bins 130A, 130B, or may be a single path among a route for a delivery of the items within such bins 130A, 130B. For example, in some embodiments, the second station 105-2 may be selected in accordance with an optimal path or route determined according to one or more algorithms, e.g., one or more traditional shortest path or shortest route algorithms such as Dijkstra's Algorithm, Bellman-Ford Algorithm, Floyd-Warshall Algorithm, Johnson's Algorithm or a hub labeling technique, by one or more computer systems or devices at the station 105-1 or in one or more other physical or virtual locations, including but not limited to one or more computer systems or devices aboard the tractor 140.

As is shown in FIG. 1P, one of the bins 130A may be removed from the modular transfer unit 110, and another bin 130A may be installed in the modular transfer unit 110 in its place. The one of the bins 130A that is removed from the modular transfer unit 110 may be disposed on the hand truck 170 or within one of a plurality of openings within the storage facility 175. For example, in some embodiments, where the station 105-2 is associated with a receiving station at a fulfillment center or like facility, the items within the bin 130A that is removed from the modular transfer unit 110 may be transported to one or more storage units or facilities (e.g., bins, bays, shelves, slots, racks, tiers, bars, hooks, cubbies or the like at the station 105-2, such as the storage facility 175, e.g., manually, automatically or by the hand truck 170, and placed into storage there. In some embodiments, where the station 105-2 is associated with a distribution station, the items within the bin 130A that is removed from the modular transfer unit 110 may be placed into one or more containers at the station 105-2 and prepared for delivery to one or more destinations specified by a customer. In some embodiments, where the station 105-2 is associated with a delivery location, e.g., a destination specified by a customer for a delivery of one or more items, the bin 130A may be transported to the delivery location, and the items within the bin 130A may be delivered to the customer.

Additionally, the bin 130A that is inserted into the modular transfer unit 110 may include items that are to be delivered to another location, e.g., by the modular transfer unit 110. Alternatively, the bin 130A that is inserted into the modular transfer unit 110 may be empty.

The delivery of items within bins and by one or more modular transfer units and/or vehicles in accordance with the present disclosure may be supervised or controlled using one or more servers or other computer-based systems, which may be in communication with various computer devices or systems associated with bins and/or modular transfer units or vehicles, as well as computer devices or systems associated with one or more items within bins, computer devices associated with one or more fulfillment centers or like facilities, computer devices or systems operated or carried by one or more human workers, and computer devices or systems associated with one or more customers or destinations for such items. Such computer devices or systems may be provided in one or more physical locations, e.g., in stations or facilities where bins may be loaded into or unloaded from modular transfer units, or in one or more alternate or virtual locations, e.g., in a "cloud"-based system.

Figure 2:
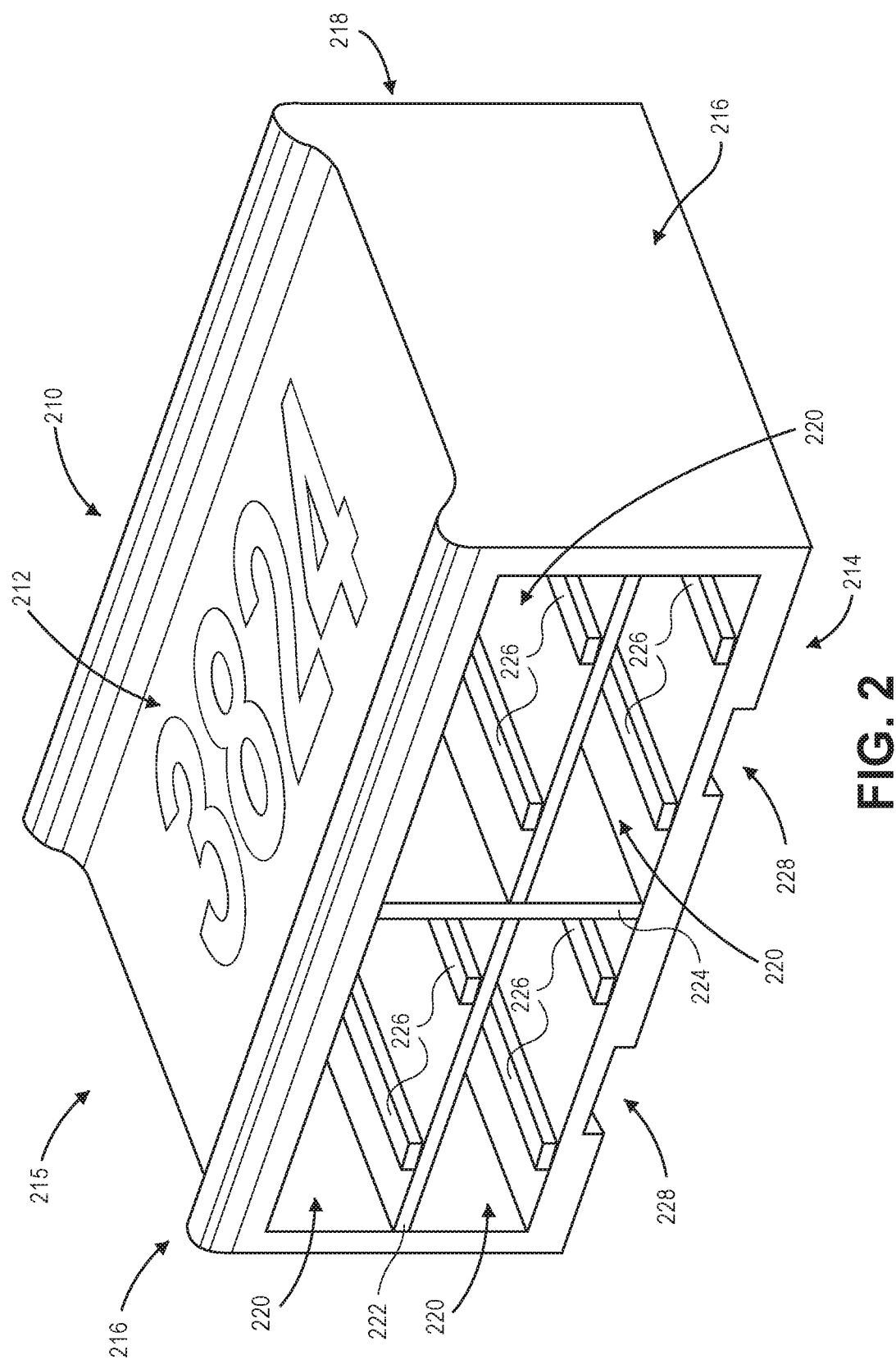
FIG. 2 is a view of one modular transfer unit in accordance with embodiments of the present disclosure.

Referring to FIG. 2, a view of one modular transfer unit in accordance with embodiments of the present disclosure is shown. Except where otherwise noted, reference numerals preceded by the number "2" in FIG. 2 refer to elements that are similar to elements having reference numerals preceded by the number "1" shown in FIGS. 1A through 1P.

As is shown in FIG. 2, a modular transfer unit 210 includes a frame 215 having a plurality of openings 220. The frame 215 includes a top panel 212, a bottom panel 214, side panels 216 and a rear panel 218. A first face of the frame 215 includes the openings 220, which are defined by a horizontal member 222 and a vertical member 224, which are joined at a substantially perpendicular connection within a center of the first face of the frame 215. The top panel 212 is substantially flat and includes raised sections at the first face of the frame 215 and where the top panel 212 meets the rear panel 218. Additionally, the top panel 212 further includes one or more markings, e.g., numbers or other alphanumeric characters, that may be used to visually identify the modular transfer unit 210, e.g., by humans or using one or more imaging devices. Alternatively, such markings may include one or more bar codes (e.g., one-dimensional bar codes or two-dimensional bar codes, such as "QR" codes), fiducial markings, or any other markings that may be provided not only on the top panel 212 but also on one or more of the bottom panel 214, the side panels 216 and/or the rear panel 218.

The modular transfer unit 210 shown in FIG. 2 is constructed about a longitudinal axis, e.g., defined by a longest dimension of the modular transfer unit 210, as well as a lateral axis and a vertical axis, each of which is perpendicular to the longitudinal axis and to one another. The openings 220 on the first face of the modular transfer unit 210 are aligned along or in parallel with the lateral axis of the modular transfer unit 210, which is configured to be mounted to a vehicle or other system. In some embodiments, the modular transfer unit 210 is mounted to a vehicle or other system with the longitudinal axis of the modular transfer unit 210 aligned along or in parallel to a direction of travel of the vehicle or other system.

As is shown in FIG. 2, each of the openings 220 has a substantially rectangular shape, and includes a pair of guides 226 aligned in parallel. For example, the two upper openings 220 shown in FIG. 2 include pairs of guides 226 mounted to the horizontal member 222, while the two lower openings shown in FIG. 2 include pairs of guides 226 mounted to the bottom panel 214. Although each of the openings 220 shown in FIG. 2 has substantially identical dimensions, e.g., identical cross-sectional areas in both vertical and horizontal planes, and identical lengths or depths, a modular transfer unit may have any number of openings 220 of any sizes or shapes in accordance with the present disclosure.

As is shown in FIG. 2, the frame 215 further includes a pair of tracks 228 or channels within an underside of the bottom panel 214. The dimensions, shapes and/or locations of the tracks 228 within the underside of the bottom panel 214 may be selected to correspond to dimensions, shapes and/or locations of guides or other features of a vehicle to which the modular transfer unit 210 may be mounted or installed.

The frame 215 may be formed from any suitable materials, including but not limited to wood, plastics (e.g., reinforced plastics such as fiberglass), metals (e.g., forged steel or aluminum, or one or more alloys thereof) or composites, and may be assembled using one or more screws, bolts, rivets, brackets or the like. For example, in some embodiments, each of the top panel 212, the bottom panel 214, the side panels 216 or the rear panel 218 may be formed in a homogeneous manner, e.g., from a common material, such as a common wood, plastic, metal or composite material, such as in a single-piece construction, or in a heterogeneous manner from two or more different materials.

In some embodiments, one or more surfaces or other features of the modular transfer unit 210 may be selected or designed for any purpose, e.g., for strength, or to optimize a number of storage units and/or items that may be transferred thereby. For example, in some embodiments, the materials, coatings or other aspects of the guides 226 and/or the horizontal member 222 or the bottom panel 214 may be selected in order to optimize a level or amount of friction encountered during the insertion of one or more bins or other storage units into the openings 220, or the removal of one or more bins or other storage units from the openings 220. Likewise, and for similar reasons, one or more materials, coatings or other aspects of the tracks 228 and/or the bottom panel 214 may be selected in order to optimize a level or amount of friction encountered during the installation of the modular transfer unit 210 onto a vehicle or other system, or the removal of the modular transfer unit 210 from the vehicle or other system. Moreover, in some embodiments, the dimensions, shapes or cross-sections of the openings 220 may be selected based on the dimensions, shapes or cross-sections of one or more bins or other storage units to be installed therein or removed therefrom.

In some embodiments, the openings 220 need not include the guides 226, and may, alternatively, include any other systems or components for receiving bins or other storage units therein, or discharging the bins or other storage units therefrom. For example, in some embodiments, the openings 220 may include one or more conveyor systems (not shown), e.g., belted conveyor systems, that may be mounted to the horizontal member 222 and/or the bottom panel 214 and configured for operation in a laterally inward direction to receive bins or other storage units into the openings 220, or in a laterally outward direction to discharge the bins or other storage units from the openings 220. In some embodiments, such conveyor systems may include any number of hooks, notches or holding extensions thereon for securing bins or other storage units thereto. Alternatively, such conveyor systems may include indents or shaped receptacles for securing bins or other storage units therein. In some other embodiments, the openings 220 may further include one or more sets of rollers or tracks that enable bins or other storage units to be inserted therein or withdrawn therefrom in a low-friction manner, as well as one or more latches or other locking devices or systems for fixing the bins or other storage units therein. Any type or form of system for receiving or discharging bins or other storage units within openings in modular transfer units may be utilized in accordance with the present disclosure.

Likewise, the modular transfer units 210 need not include the tracks 228, and may instead include any other systems or components that enable the modular transfer units 210 to be loaded onto or removed from one or more vehicles or other systems.

Figure 3:
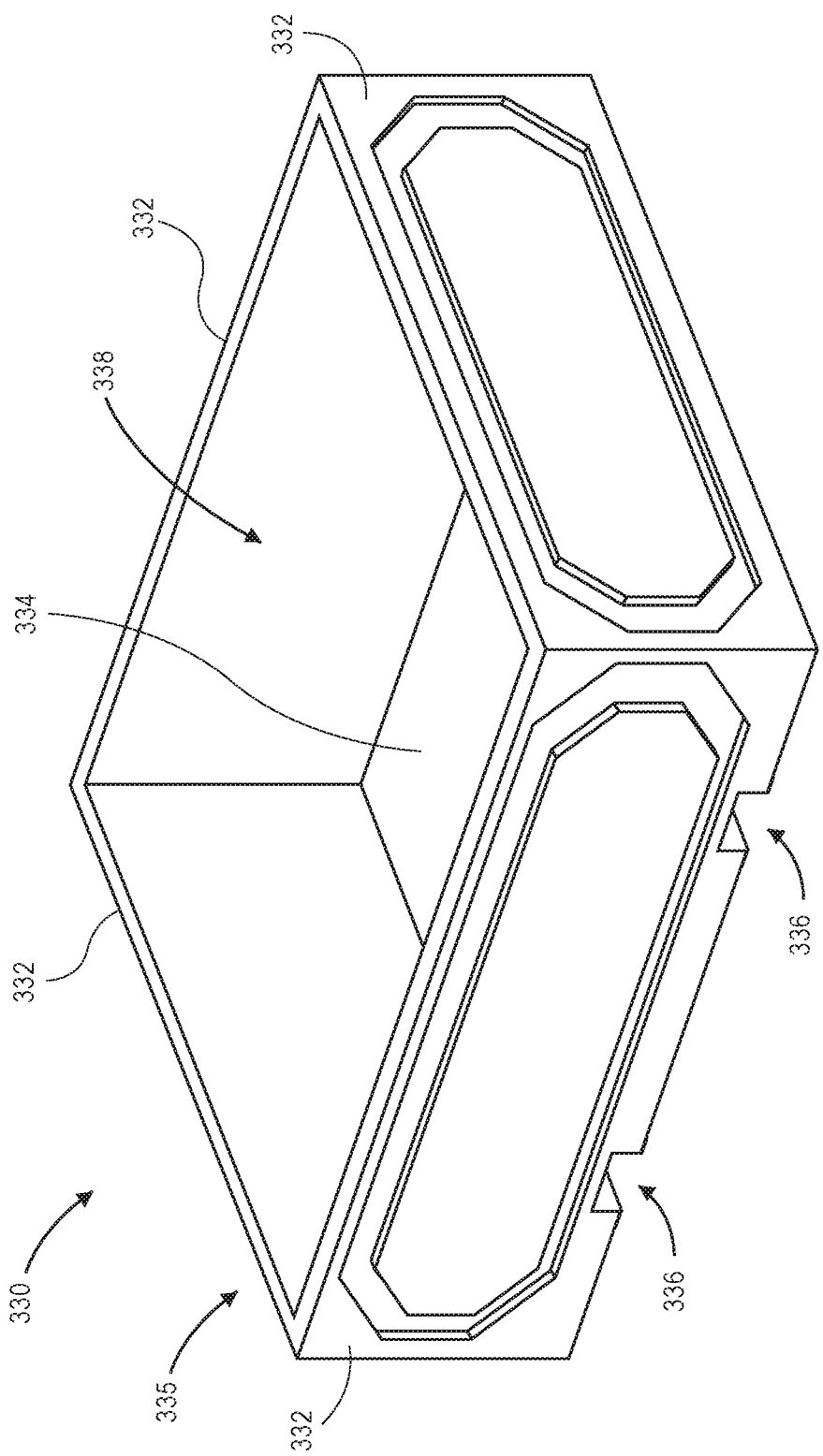
FIG. 3 is a view of one storage unit in accordance with embodiments of the present disclosure.

Referring to FIG. 3, a view of one storage unit in accordance with embodiments of the present disclosure is shown. Except where otherwise noted, reference numerals preceded by the number "3" in FIG. 3 refer to elements that are similar to elements having reference numerals preceded by the number "2" in FIG. 2 and by the number "1" shown in FIGS. 1A through 1P.

As is shown in FIG. 3, a bin (or other storage unit) 330 includes a frame 335 that defines a cavity 338 having an opening. The frame 335 is formed from a plurality of side panels 332 and a bottom panel 334. Although each of the side panels 332 shown in FIG. 3 has a substantially common length, width and height, and although the bottom panel 334 and a cross-section of the cavity 338 are square, those of ordinary skill in the pertinent arts will recognize that bins or other storage units of the present disclosure may have any shapes or cross-sections, and may be square, rectangular, round, cylindrical, triangular, pyramidal or of any other shape or cross-section. Additionally, each of the side panels 332 or the bottom panel 334 of the frame 335 may be formed from any suitable materials, including but not limited to wood, plastics (e.g., reinforced plastics such as fiberglass), metals (e.g., forged steel or aluminum, or one or more alloys thereof) or composites. In some embodiments, the frame 335 may further include a cover (or top panel) that may be coupled to the frame 335, e.g., by a hinge or other system, or a discrete member that may be temporarily opened, or otherwise manipulated to enable items to be placed therein or withdrawn therefrom, and closed to seal or secure one or more items therein. For example, the frame 335 may further include a cover or other system that renders the frame 335 airtight or watertight when closed.

Furthermore, in some embodiments, a bin may be flexible in nature, and need not be rigidly formed. For example, in some embodiments, a bin may be formed from flexible materials, including but not limited to knitted, woven or non-woven fabrics, natural or synthetic leathers or canvases, or other like materials that may be joined at one or more edges thereof, such as by stitching. A bin formed from flexible materials may optionally include a rigid or semi-rigid frame formed from metals, plastics or other materials, and may optionally be suspended within one or more openings of modular transfer units, e.g., by one or more hooks, guides, bars, suspenders or other systems.

In some embodiments, one or more surfaces or other features of the bin 330 may be selected or designed for any purpose, e.g., for strength, or to optimize a level or amount of friction encountered during the insertion of the bin 330 into one or more openings, or the removal of the bin 330 from such openings. Likewise, and for similar reasons, one or more materials, coatings or other aspects of the tracks 336 and/or the bottom panel 334 may be selected in order to optimize a level or amount of friction encountered during the installation of the bin 330 onto a vehicle or other system, or the removal of the bin 330 from the vehicle or other system. Moreover, in some embodiments, the dimensions, shapes or cross-sections of the tracks 336 may be selected based on the dimensions, shapes or cross-sections of one or more guides of modular transfer units into which the bin 330 is to be installed or from which the bin 330 is to be removed. Furthermore, one or more of the side panels 332 or the bottom panel 334 of the bin 330 may include one or more markings such as alphanumeric characters, symbols, bar codes (e.g., one-dimensional bar codes or two-dimensional bar codes, such as "QR" codes), fiducial markings, or any other markings that may be interpreted using one or more scanners or imaging devices or other systems.

Alternatively, or additionally, and as is discussed above with regard to the modular transfer unit 210 of FIG. 2, the bin 330 need not include the tracks 336, and may instead include one or more other systems or components that enable the bins to be received within or discharged from one or more openings of modular transfer units in accordance with the present disclosure.

Additionally, the bin 330 may be outfitted or equipped with one or more position sensors or systems, including but not limited to one or more Global Positioning System ("GPS") transmitters and/or receivers. One or more position sensing systems or components may be embedded within one or more of the side panels 332 or the bottom panel 334, or attached or otherwise mounted to one or more of the side panels 332 or the bottom panel 334. Information or data received or sent by such systems or components may be processed to determine a position of the bin 330, e.g., as the bin 330 is within storage or in transit by one or more modular transfer units or other vehicles. In some embodiments, the bin may be further outfitted or equipped with one or more communications system components, e.g., transmitters and/or receivers, which may also be embedded within one or more of the side panels 332 or the bottom panel 334, or attached to one or more of the side panels 332 or the bottom panel 334. Information or data received or sent by such systems or components may be processed to determine a status of the bin 330, or one or more items disposed therein, or of one or more modular transfer units or other vehicles to which the bin 330 is mounted or otherwise associated. For example, where one or more items within the bin 330 and the bin 330 are outfitted or equipped with one or more components for communicating via near field communication ("NFC"), radio frequency identification ("RFID"), Bluetooth® or any other system or protocol, an inventory or other record of the contents of the bin 330 may be determined based on information or data received from such items, and position signals or other information or data regarding a location of the bin 330 may be associated with each of such items. Likewise, where the bin 330 is mounted to or otherwise associated with a modular transfer unit or other vehicle, and the modular transfer unit or other vehicle is likewise configured for communication via one or more systems or protocols, the bin 330 may transmit or receive information or data regarding the contents of the bin 330, and position signals or other information or data regarding a location of the bin 330 and the contents thereof may be shared and associated with the modular transfer unit or other vehicle.

Bins or other storage units may be installed into or removed from modular transfer units in any manner in accordance with the present disclosure. Referring to FIGS. 4A through 4D, views of aspects of one storage unit configured for transportation by a modular transfer unit in accordance with embodiments of the present disclosure are shown. Except where otherwise noted, reference numerals preceded by the number "4" in FIGS. 4A through 4D refer to elements that are similar to elements having reference numerals preceded by the number "3" in FIG. 3, by the number "2" in FIG. 2 and by the number "1" shown in FIGS. 1A through 1P.

Figure 4A:
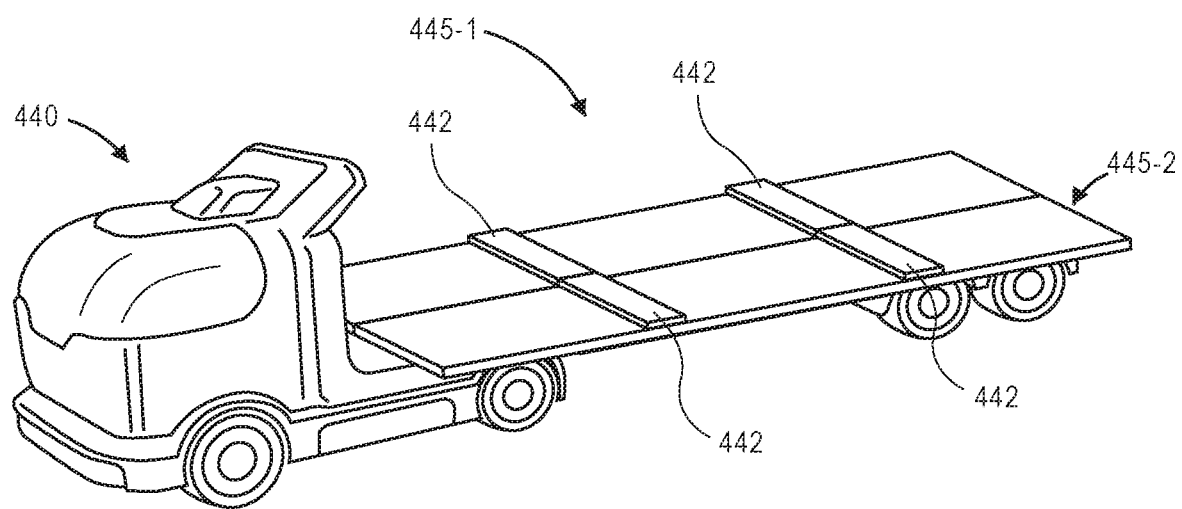
FIGS. 4A through 4D are views of aspects of one storage unit configured for transportation by a modular transfer unit in accordance with embodiments of the present disclosure.

As is shown in FIG. 4A, a road tractor 440 (or truck, van or any other vehicle) is coupled to a pair of adjustable trailer beds 445-1, 445-2 (or other surfaces or components) provided on a trailer or other vehicle in any manner. Each of the trailer beds 445-1, 445-2 is adjustable in nature, and is shown in FIG. 4A as being aligned or positioned at a substantially horizontal (or zero) angle and a first elevation. Each of the trailer beds 445-1, 445-2 includes a pair of guides 442 aligned in parallel with one another, such that the trailer beds 445-1, 445-2 may accommodate a single modular transfer unit, e.g., the modular transfer unit 110 of FIG. 1E or the modular transfer unit 210 of FIG. 2, thereon or, alternatively, each of the trailer beds 445-1, 445-2 may independently accommodate a discrete modular transfer unit thereon.

Figure 4B:
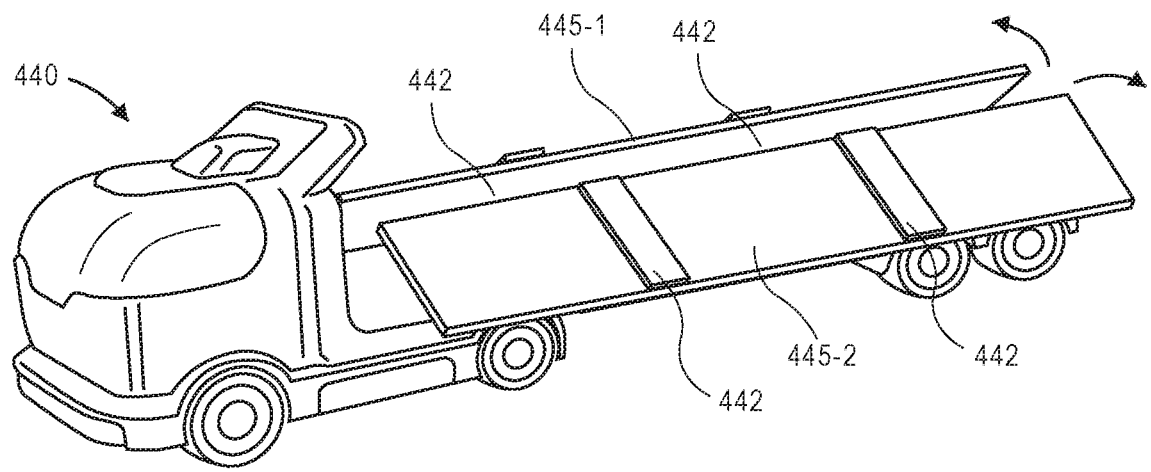

As is shown in FIG. 4B, the trailer beds 445-1, 445-2 may be configured to elevate and/or rotate in any direction with respect to one another, e.g., by one or more hydraulic, electromotive or other mechanical systems disposed beneath the trailer beds 445-1, 445-2. For example, as is shown in FIG. 4B, the trailer bed 445-1 may be configured to lift and rotate in an outward direction, e.g., away from the trailer bed 445-2, to a non-horizontal (or non-zero) angle, or a second elevation about a longitudinal axis or about an axis parallel to the longitudinal axis. As is also shown in FIG. 4B, the trailer bed 445-2 may be configured to lift and rotate in an opposite outward direction, e.g., away from the trailer bed 445-1, to the same non-horizontal (or non-zero) angle or to a different angle, or to the second elevation or to a different elevation.

Figure 4C:
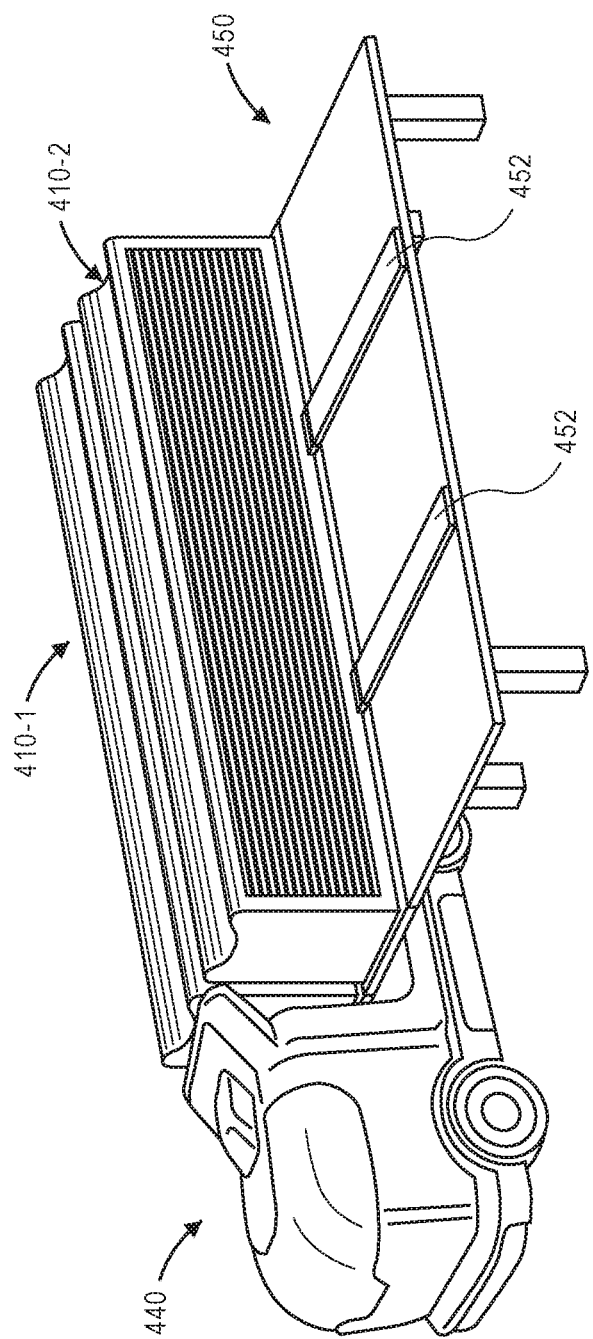
Figure 4D:
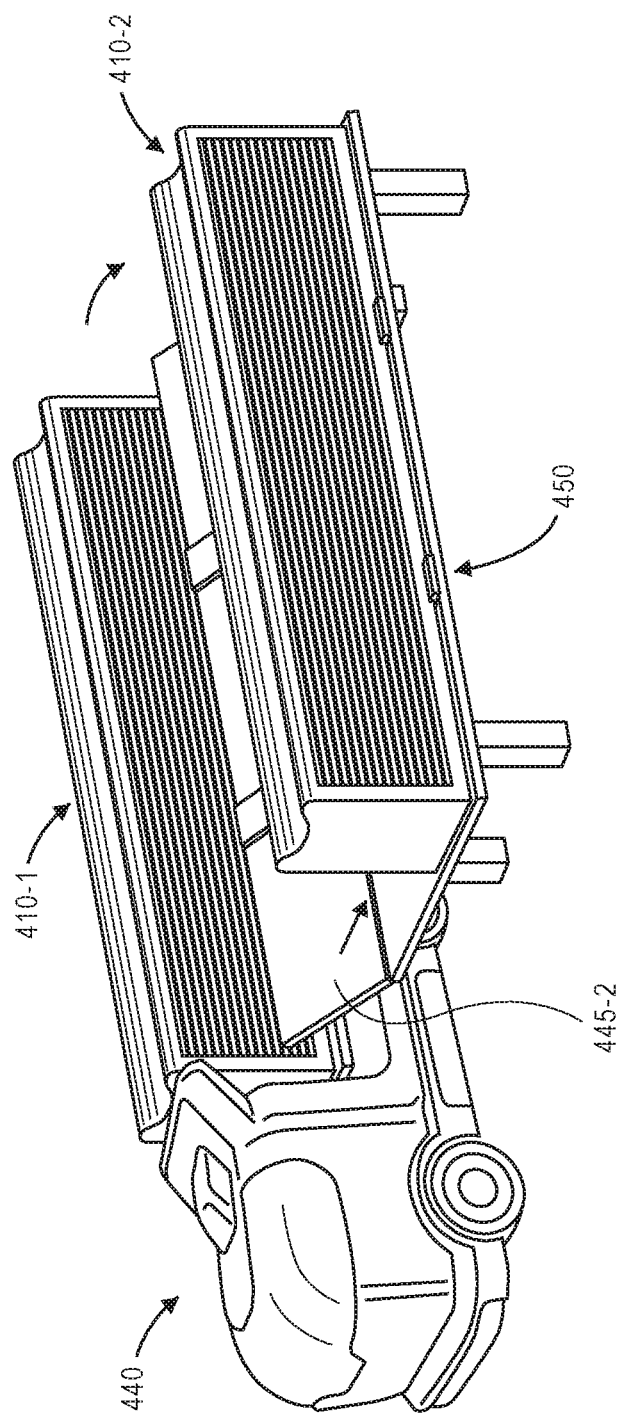

The operation of the trailer beds 445-1, 445-2 as is shown in FIG. 4B may be utilized to receive one or more modular transfer units thereon, or to discharge one or more modular transfer units therefrom. As is shown in FIG. 4C, a pair of modular transfer units 410-1, 410-2 are coupled to the trailer beds 445-1, 445-2. The modular transfer unit 410-2 is disposed on the trailer bed 445-2, aligned adjacent to a loading dock 450 having a pair of guides 452. The guides 452 of the loading dock 450 are co-aligned with the guides 442 of the trailer bed 445-2. As is shown in FIG. 4D, the modular transfer unit 410-2 is discharged from the trailer bed 445-2 by elevating and/or rotating the trailer bed 445-2, such as is shown in FIG. 4B, which causes the modular transfer unit 410-2 to slide from the trailer bed 445-2 onto the loading dock 450, e.g., by gravity. Alternatively, in some embodiments, trailer beds or portions thereof, e.g., the trailer beds 445-1, 445-2, may be configured to descend and/or rotate inward to aid in receiving modular transfer units thereon.

In some embodiments, trailer beds or portions thereof may be configured to elevate or descend, or rotate in any direction, in order to enable modular transfer units or bins to be loaded thereon or discharged therefrom in accordance with embodiments of the present disclosure. For example, referring again to FIGS. 4A and 4B, in some embodiments, each of the trailer beds 445-1, 445-2 may be configured to rotate about a lateral axis or about an axis parallel to the lateral axis, thereby causing a forward end of either of the trailer beds 445-1, 445-2 to rise and an aft end to fall, or vice versa. In still other embodiments, either of the trailer beds 445-1, 445-2 may be configured to rotate about a vertical axis, thereby causing either of the trailer beds 445-1, 445-2 to pivot in a clockwise or a counterclockwise direction. Moreover, in some embodiments, a vehicle may include any number of rotatable or repositionable trailer beds or other surfaces for loading modular transfer units or bins thereon, or discharging modular transfer units or bins therefrom, in accordance with the present disclosure, including as few as one or any number greater than one.

Bins or other storage units may be inserted into or withdrawn from modular transfer units manually or by one or more automated systems, e.g., autonomous mobile robots. Referring to FIGS. 5A through 5D, views of aspects of one system for delivering items using modular transfer units in accordance with embodiments of the present disclosure are shown. Except where otherwise noted, reference numerals preceded by the number "5" in FIGS. 5A through 5D refer to elements that are similar to elements having reference numerals preceded by the number "4" in FIGS. 4A through 4D, by the number "3" in FIG. 3, by the number "2" in FIG. 2 and by the number "1" shown in FIGS. 1A through 1P.

As is shown in FIG. 5A, a bin 530 includes a pair of tracks 536 provided on opposing vertical sides of the bin 530, and are aligned substantially horizontally, or substantially parallel to a bottom surface of the bin 530. Alternatively, the tracks 536 may be provided in any other location or position with respect to the bin 530, or in any alignment. An autonomous mobile robot 554 has a fork 556 (or one or more prongs, tines or other elements). The dimensions and shapes of the fork 556 may be selected to correspond to dimensions and shapes of the tracks 536. The fork 556 may be raised, lowered and/or rotated, as necessary, in order to mate or couple the fork 556 with the bin 530. Additionally, the fork 556 and/or the tracks 536 may include one or more sensors for guiding the autonomous mobile robot 554 in mating or coupling the fork 556 with the bin 530. For example, the fork 556 and/or the tracks 536 may be outfitted with one or more NFC sensors, RFID sensors, digital cameras or other imaging devices, or any other sensors.

As is shown in FIG. 5B, a modular transfer unit 510 includes a plurality of bins 530 inserted therein and a vacant opening 520. The bins 530 of FIG. 5B have substantially identical dimensions, shapes and cross-sections as the bin 530 of FIG. 5A, and the opening 520 has dimensions, shapes and a cross-section that are sized to accommodate the bin 530 of FIG. 5A, or any of the other bins 530 shown in FIG. 5B. Moreover, the opening 520 includes guides or other features that are sized or shaped to accommodate the bin 530 of FIG. 5A, or any of the other bins 530 shown in FIG. 5B, or to enable the bin 530 of FIG. 5A or any of the other bins 530 shown in FIG. 5B to be inserted therein.

In some embodiments, the fork 556 may include one or more end effectors or other systems enabling the fork 556 to mate with the tracks 536. For example, ends of the fork 556 may include one or more magnets, claws, grips or hooks that may be manually or automatically operated to engage with a bin 530 by way of the tracks 536, or in any other manner, or to disengage with a bin 530 after the bin 530 has been inserted into or removed from the opening 520.

Figure 5C:
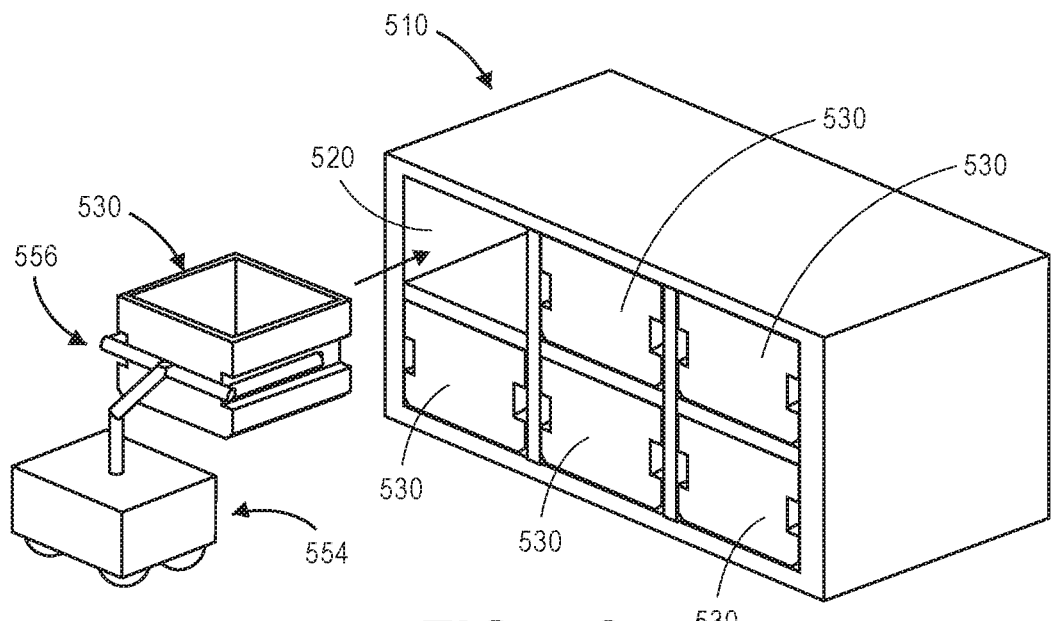
Figure 5D:
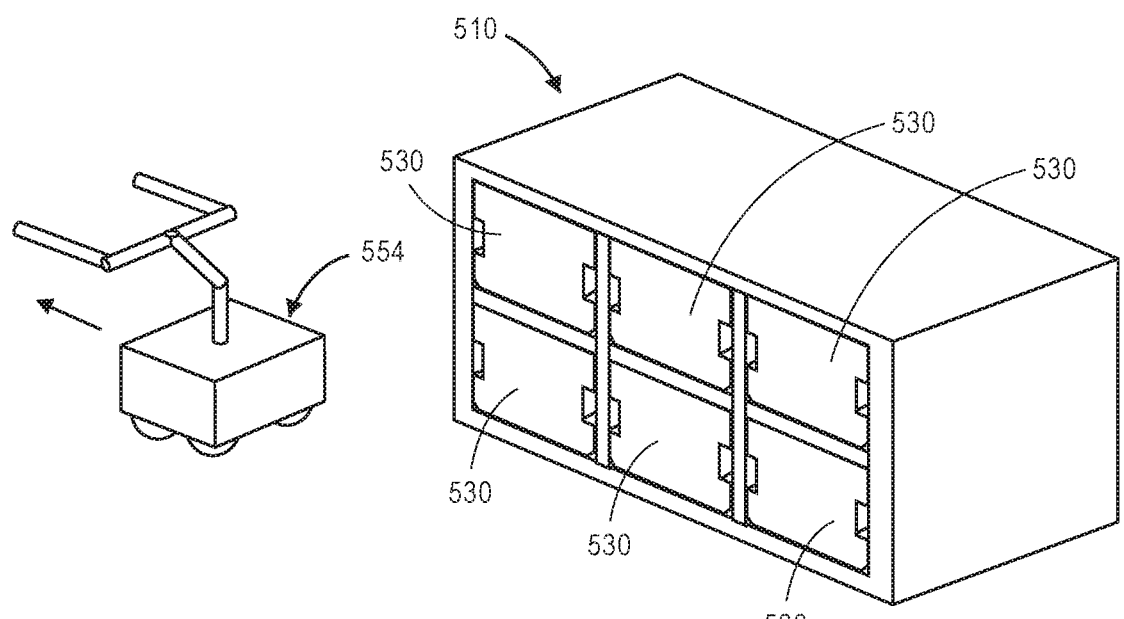

As is shown in FIG. 5C, the autonomous mobile robot 554 causes the fork 556 to couple with the bin 530, and aligns the fork 556 and the bin 530 thereon with the opening 520 in the modular transfer unit 510. With the bin 530 aligned with the opening 520, the autonomous mobile robot 554 may proceed forward, e.g., toward the modular transfer unit 510, to insert the bin 530 therein. In some embodiments, the opening 520 may include any conveyors or other systems or components for aiding in the receipt of the bin 530 therefrom. As is shown in FIG. 5D, after inserting the bin 530 into the opening 520, the autonomous mobile robot 554 disengages from the bin 530, and departs from the modular transfer unit 510 for further tasking. Subsequently, the modular transfer unit 510 may be transported to another location, e.g., by a vehicle such as the road tractor 140 of FIG. 1F or the flat car 150 of FIG. 1I, where one or more of the bins 530 may be removed therefrom or replaced with other bins 530.

A modular transfer unit may be formed by combining bins or other storage units in any manner, and need not require a discrete frame or other structure. Referring to FIGS. 6A through 6D, views of aspects of one system for delivering items using modular transfer units in accordance with embodiments of the present disclosure are shown. Except where otherwise noted, reference numerals preceded by the number "6" in FIGS. 6A through 6D refer to elements that are similar to elements having reference numerals preceded by the number "5" in FIGS. 5A through 5D, by the number "4" in FIGS. 4A through 4D, by the number "3" in FIG. 3, by the number "2" in FIG. 2 and by the number "1" shown in FIGS. 1A through 1P.

Figure 6A:
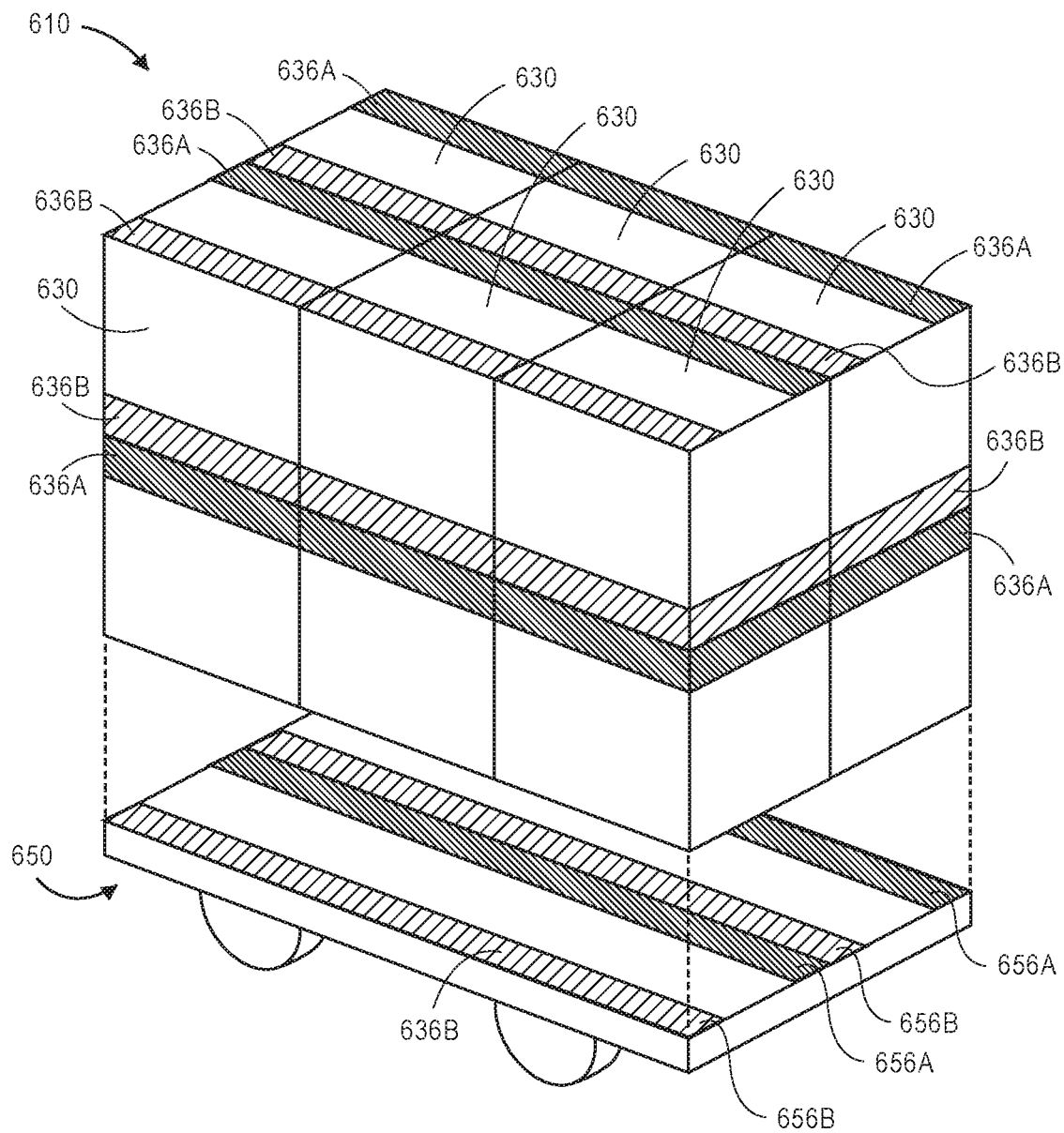
FIGS. 6A through 6D are views of aspects of one system for delivering items using modular transfer units in accordance with embodiments of the present disclosure.

As is shown in FIG. 6A, a modular transfer unit 610 is formed from a plurality of bins 630 or other storage units that are magnetically coupled to one another. The modular transfer unit 610 is shown as being placed on a flat car 650 or other vehicle.

As is shown in FIG. 6A, each of the bins 630 includes magnetized strips 636A, 636B (or bands and/or other contact surfaces) that are separately polarized, such that the magnetized strips 636A are attracted to the magnetized strips 636B, and the magnetized strips 636B are attracted to the magnetized strips 636A. The magnetized strips 636A, 636B are provided on sides of the respective bins 630, and on undersides of the bins 630 (not shown). Alternatively, in some embodiments, the magnetized strips 636A, 636B may be embedded within surfaces of the respective bins 630, e.g., on sides or undersides of the bins 630. Moreover, the magnetized strips 636A, 636B may have any shape, and need not take the form of strips, e.g., rectangular shapes having substantially longer lengths than heights. For example, the bins 630 may include magnetized objects or components having shapes of circles, triangles, rectangles, or other regular or irregular shapes that are provided in discrete locations on or within surfaces of such bins 630.

The magnetized strips 636A, 636B may be electromagnets, as well as any magnetized or magnetizable objects or substances capable of generating a magnetic field in the absence of an applied magnetic field, e.g., any magnetic or ferrous materials, including but not limited to iron, steel, cobalt, nickel or alloys including one or more of such materials, as well as one or more natural Earth or rare-Earth magnets, composite magnets or any other substances that can possess magnetization or magnetic properties in the absence of a magnetic field below a Curie temperature. Additionally, as is also shown in FIG. 6A, the flat car 650 further includes a plurality of magnetized strips 656A, 656B (or bands and/or other contact surfaces), each of which is separately polarized to correspond to the magnetized strips 636A, 636B, such that the magnetized strips 636A of the bins 630 are attracted to the magnetized strips 656B of the flat car 650, and the magnetized strips 636B of the bins 630 are attracted to the magnetized strips 656A of the flat car 650.

Figure 6B:
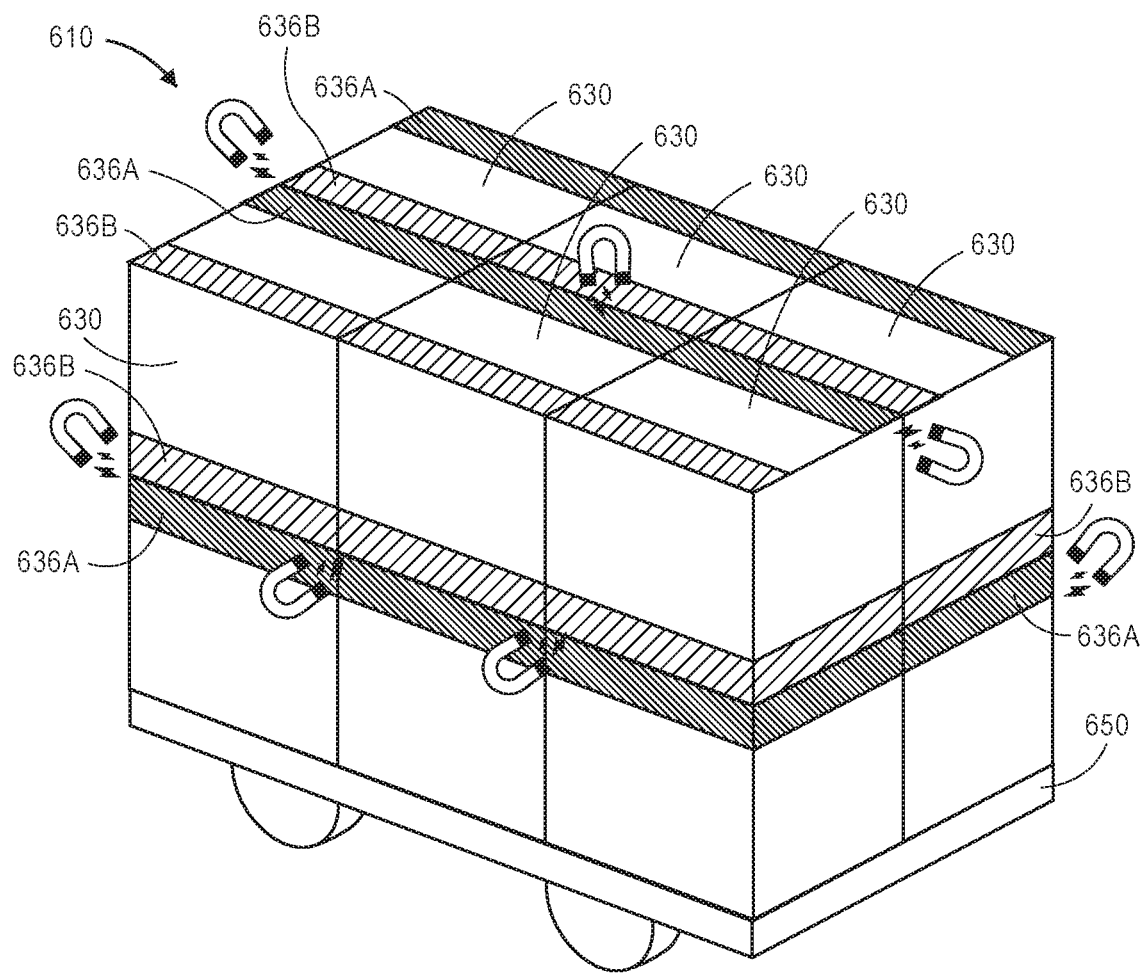

As is shown in FIG. 6B, with each of the bins 630 on the flat car 650, the modular transfer unit 610 is formed by energizing corresponding magnetized strips 636A, 636B of the adjacent bins 630 that are in contact with one another, or otherwise placing magnetized strips 636A, 636B of the adjacent bins 630 in contact with one another. Additionally, magnetized strips 636A, 636B on undersides of the bins 630 may be energized or otherwise placed in contact with the magnetized strips 656A, 656B of the flat car 650, in order to secure the modular transfer unit 610 or the respective bins 630 thereof to the flat car 650.

Figure 6C:
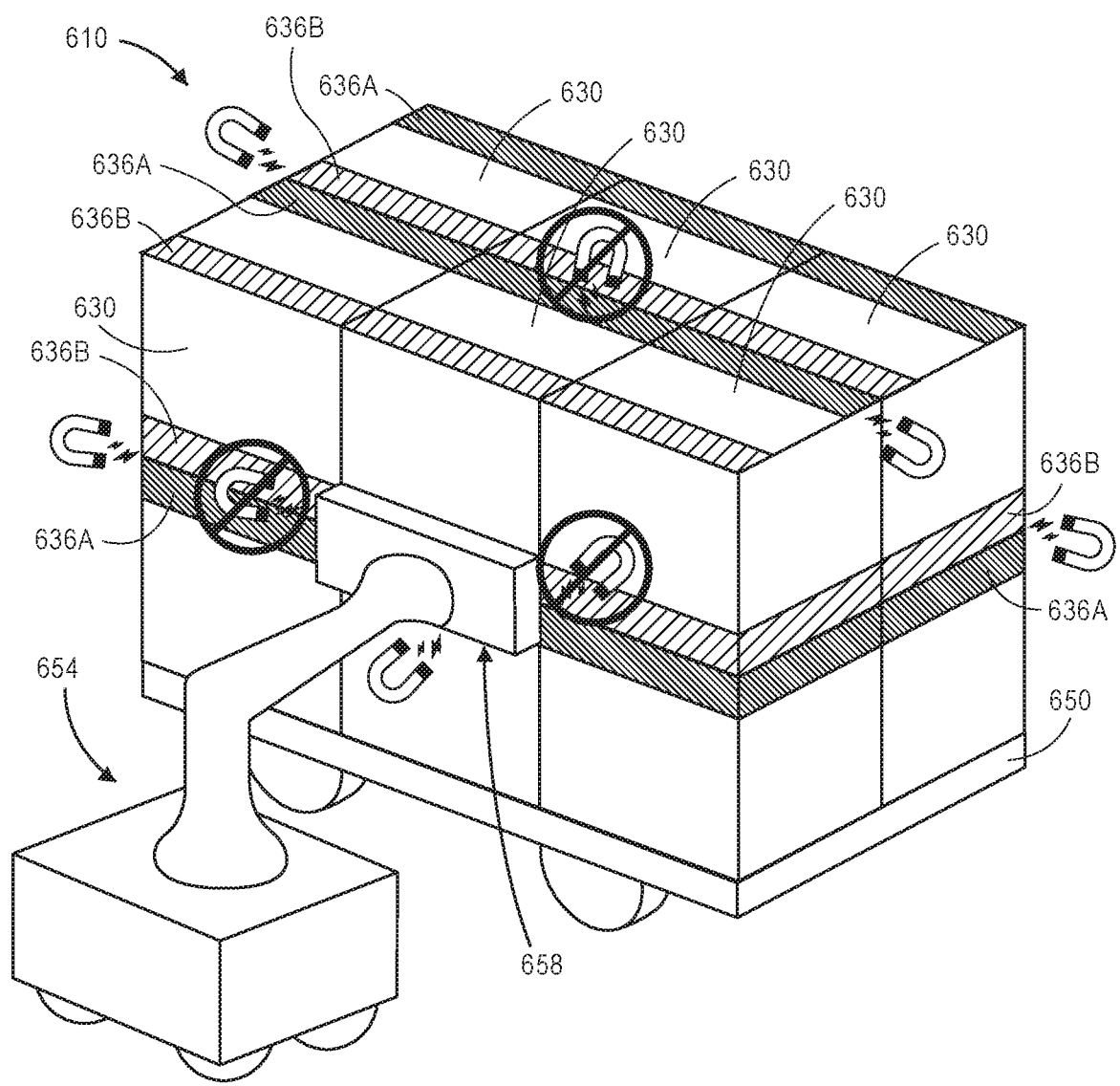
Figure 6D:
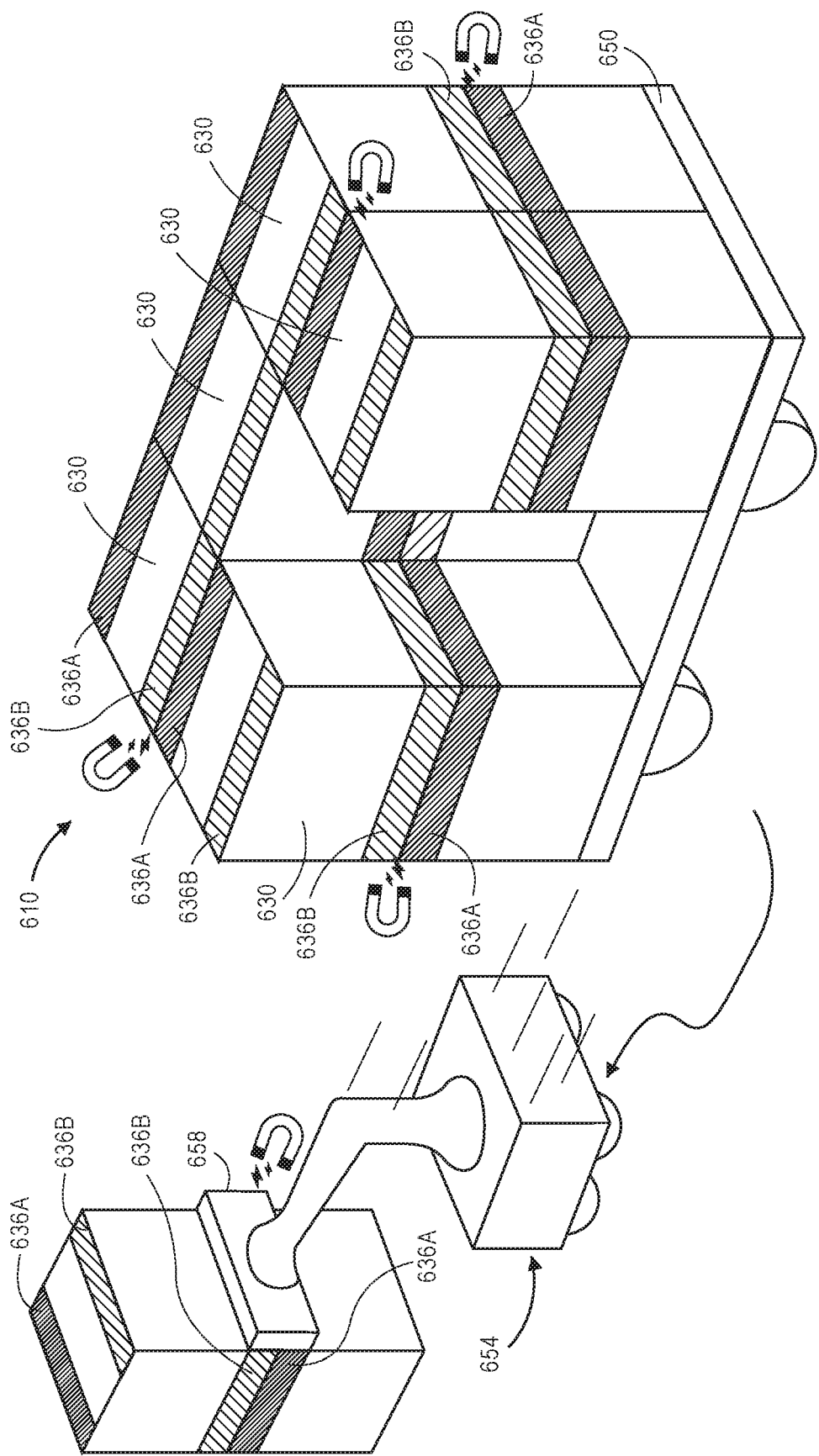

As is shown in FIGS. 6C and 6D, one of the bins 630 may be removed from the modular transfer unit 610 using an autonomous mobile robot 654 having a magnetized arm 658. The magnetized arm 658 may have one or more magnetized elements that may be energized or otherwise placed into contact with a bin, a storage unit or another object having one or more corresponding magnetized elements. As is shown in FIG. 6C, the autonomous mobile robot 654 may cause the magnetized arm 658 into contact with a selected one of the bins 630. As is shown in FIG. 6D, the autonomous mobile robot 654 backs away from the modular transfer unit 610 with the selected bin 630 coupled to the magnetized arm 658, thereby causing the selected bin 630 to be removed from the modular transfer unit 610. In concert, the magnetized strips 636A, 636B of the selected bin 630 and other bins, or the magnetized strips 656A, 656B of the flat car 650 beneath the selected bin 630, may be deenergized to enable the selected bin 630 to be removed therefrom. The autonomous mobile robot 654 then removes the selected bin 630 to another location. For example, where the selected bin 630 contains one or more items, the autonomous mobile robot 654 may deliver the selected bin 630 to a location specified in an order for the one or more items, or a location within a fulfillment center or other facility where the one or more items are to be stored.

Figure 7A:
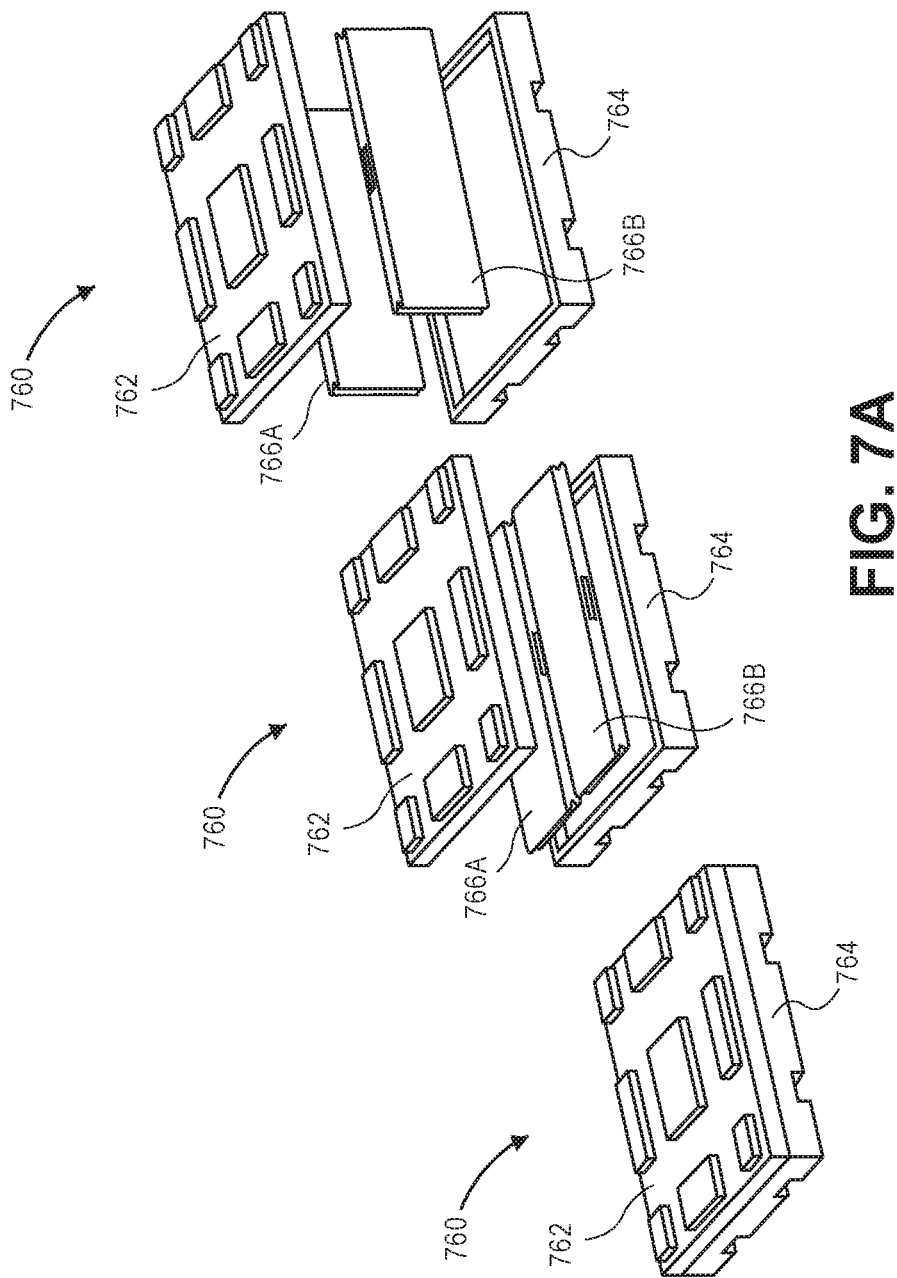
Figure 7C:
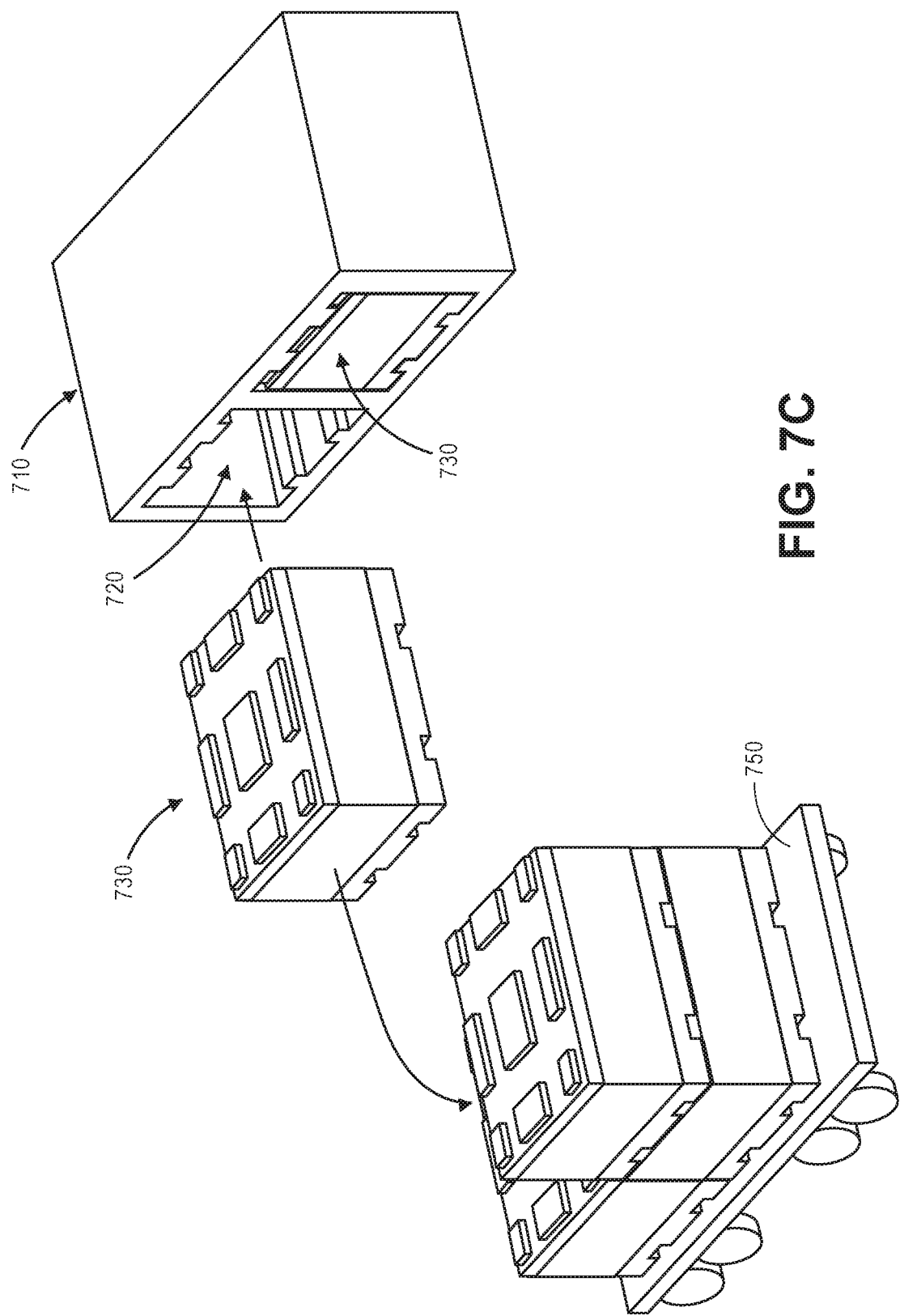

A bin for transporting items within a modular transfer unit may be assembled from preconstructed parts. Referring to FIGS. 7A through 7C, views of aspects of one system for delivering items using modular transfer units in accordance with embodiments of the present disclosure are shown. Except where otherwise noted, reference numerals preceded by the number "7" in FIGS. 7A through 7C refer to elements that are similar to elements having reference numerals preceded by the number "6" in FIGS. 6A through 6D, by the number "5" in FIGS. 5A through 5D, by the number "4" in FIGS. 4A through 4D, by the number "3" in FIG. 3, by the number "2" in FIG. 2 and by the number "1" shown in FIGS. 1A through 1P.

As is shown in FIG. 7A, a preassembled bin 760 includes a top panel 762 and a bottom panel 764 defining a container with a pair of collapsible outer panels 766A, 766B therein. An upper surface of the top panel 762 and a lower surface of the bottom panel 764 include raised surfaces defining tracks or channels therein. The dimensions and spacing of the tracks or channels within the top panel 762 or the bottom panel 764 may also correspond to the dimensions and spacing of one or more elements for loading the preassembled bin 760, or a bin assembled from the top panel 762, the bottom panel 764 or one or more of the outer panels 766A, 766B into or removing the preassembled bin 760 or an assembled bin from a modular transfer unit, e.g., forks, tines or other components of a forklift or like machine.

As is shown in FIG. 7B, the outer panels 766A, 766B may be folded and/or flattened pieces having one or more sections or pieces that may be unfolded and expanded in order to define a perimeter of an assembled bin 730. For example, as is shown in FIG. 7B, each of the outer panels 766A, 766B may include a pair of straight sections and a pair of folded sections collapsed between the straight sections. Each of the outer panels 766A, 766B may be unfolded to form a perimeter housing having a substantially square cross-section and stacked atop one another to define a cavity having a fixed cross-sectional area and variable height that may be capped or enclosed by the top panel 762 and the bottom panel 764. As is further shown in FIG. 7B, a plurality of items 70 may be placed on an upper surface of the bottom panel 764, and the joined or coupled outer panels 766A, 766B may be shrouded around the items 70 before placing the top panel 762 thereon to form the bin 730. The capacity of the bin 730 (e.g., a number or size of the items formed from the top panel 762, the bottom panel 764 and the outer panels 766A, 766B may be defined by a number of the outer panels 766A, 766B that are stacked in succession atop one another.

The bins 730 formed as is shown in FIGS. 7A and 7B may be inserted into one or more openings of a modular transfer unit or placed onto a vehicle directly. As is shown in FIG. 7C, a modular transfer unit 710 has a vacant opening 720 in a front face. The vacant opening 720 has dimensions, shapes and a cross-section that are sized to accommodate the bin 730 as assembled in accordance with FIGS. 7A and 7B. Additionally, a flat car 750 or other vehicle may also be configured to receive, transport and/or discharge one or more of the bins 730 as assembled in accordance with FIGS. 7A and 7B. The bin 730 assembled as is shown in FIGS. 7A and 7B may be inserted into the vacant opening 720 or placed onto the flat car 750 manually or by one or more automated systems, e.g., autonomous mobile robots, or in any other manner.

Figure 8:
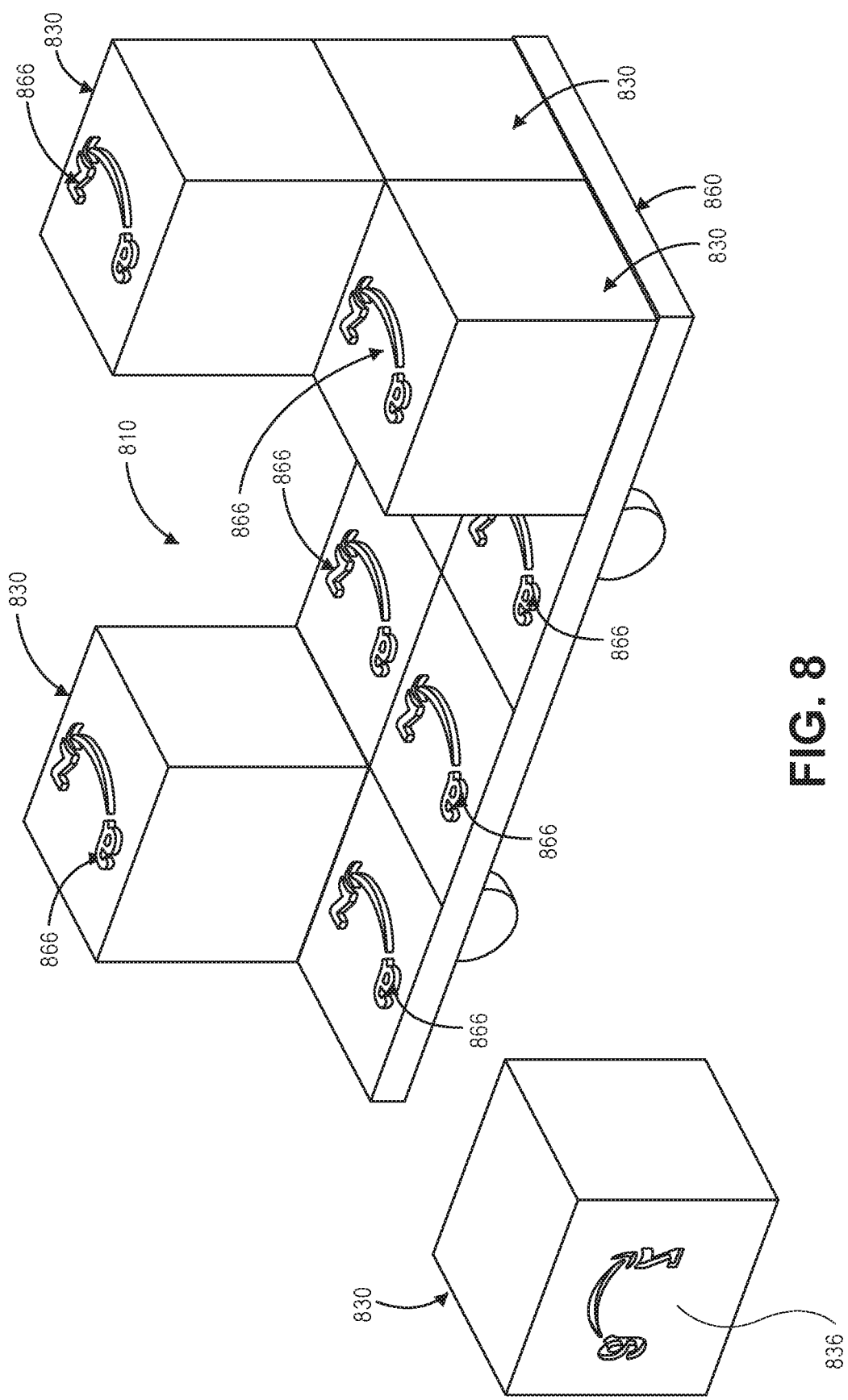
FIG. 8 is a view of aspects of one system for delivering items using modular transfer units in accordance with embodiments of the present disclosure.

A bin for transporting items within a modular transfer unit may also be defined using a tray, a platform or another system having raised sections that are sized or configured to mate or otherwise interface with corresponding openings within items or containers. Referring to FIG. 8, a view of aspects of one system for delivering items using modular transfer units in accordance with embodiments of the present disclosure is shown. Except where otherwise noted, reference numerals preceded by the number "8" in FIG. 8 refer to elements that are similar to elements having reference numerals preceded by the number "7" in FIGS. 7A through 7C, by the number "6" in FIGS. 6A through 6D, by the number "5" in FIGS. 5A through 5D, by the number "4" in FIGS. 4A through 4D, by the number "3" in FIG. 3, by the number "2" in FIG. 2 and by the number "1" shown in FIGS. 1A through 1P.

As is shown in FIG. 8, a modular transfer unit 810 includes a bin 830 resting on a platform 860 having a plurality of raised symbols 866 thereon. Storage units having a cavity 836 corresponding to one of the raised symbols 866, such as another of the bin 830, may be deposited on the platform 860 by aligning the corresponding cavity 836 with one of the raised symbols 866. Additionally, as is also shown in FIG. 8, a bin 830 may further include a raised symbol 866 thereon, thereby enabling additional storage units, such as another of the bin 830 having a cavity 836 corresponding to one of the raised symbols 866, to be stacked atop the bin 830 by aligning the corresponding cavity 836 with one of the raised symbols 866. The modular transfer unit 810, including the platform 860 and any number of bins 830 thereon, may be transported to one or more locations where the bins 830 may be removed therefrom or augmented with additional bins 830 or other storage units having cavities 836 corresponding to one of the raised symbols 866.

Figure 9:
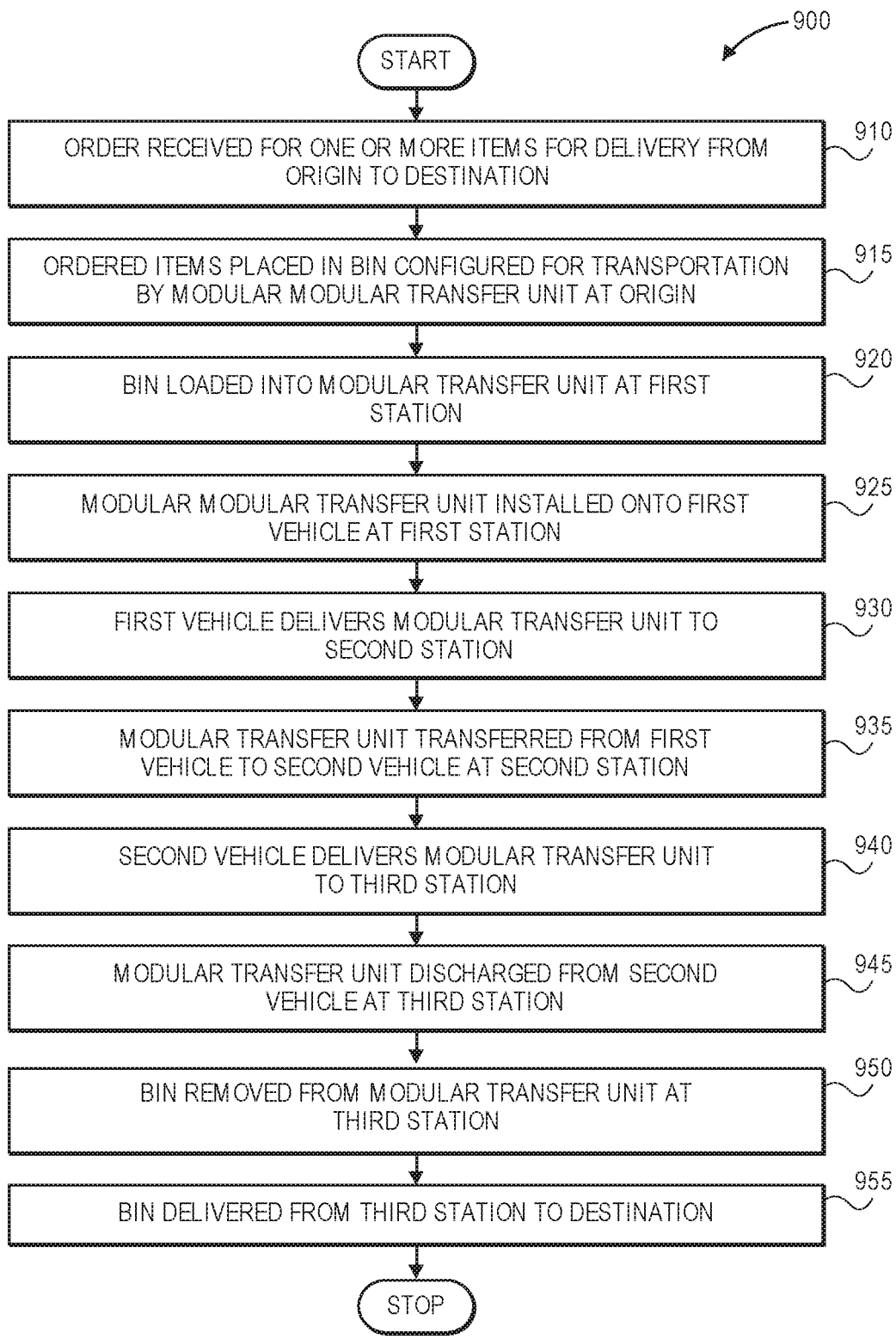
FIG. 9 is a flow chart of one process for delivering items using modular transfer units in accordance with embodiments of the present disclosure.

The modular transfer units and bins or other storage units carried thereon may be utilized to deliver items from one location to another, for any reason or purpose. Referring to FIG. 9, a flow chart 900 of one process for delivering items using modular transfer units in accordance with embodiments of the present disclosure is shown. At box 910, an order is received for the delivery of one or more items from an origin to a destination. For example, the origin may be a location of a manufacturer, a merchant, a seller or a vendor in possession of the ordered items, a fulfillment center or other facility at which the ordered items are stored, or any other location. The destination may be a location specified in the order, including but not limited to a street address or other identifier designated by a customer or other entity that placed the order, or a location of a fulfillment center or other facility where the items are to be received and stored.

At box 915, the ordered items are placed in a bin that is configured for transportation by a modular transfer unit at the origin. For example, the bin may be an open carrier such as the bins 130A, 130B of FIGS. 1C and 1D, or the bin 530 of FIG. 5A, as well as a closed container such as one or more of the bins 630 shown in FIG. 6A, the assembled bin 730 shown in FIG. 7C, or the bin 830 shown in FIG. 8, or any other storage unit that may be loaded into or removed from a modular transfer unit. In some embodiments, where the ordered items are separately or collectively outfitted with one or more communications systems, and the bin is likewise configured to communicate with such systems, the placement of the ordered items in the bin may be sensed and/or registered by the bin, which may store information or data regarding the contents of the bin in one or more data stores, or transmit the information or data to one or more external systems, e.g., over one or more networks. At box 920, the bin is loaded into a modular transfer unit at a first station, e.g., manually or by one or more automated systems, e.g., autonomous mobile robots, such as is shown in FIG. 5C, or in any other manner. In some embodiments, where the modular transfer unit and/or the bin are outfitted with one or more communications systems, the loading of the bin onto the modular transfer unit may be sensed and/or registered by the modular transfer unit, which may store information or data regarding the bin or its contents in one or more data stores, or transmit the information or data to one or more external systems, e.g., over one or more networks.

At box 925, the modular transfer unit is loaded onto a first vehicle at the first station. For example, the first vehicle may be configured for travel on one or more roads, sets of rails, bodies of water or other modes of transit, and may receive the modular transfer unit manually or by one or more automated systems. In some embodiments, where the first vehicle and the modular transfer unit or the bin are outfitted with one or more communications systems, the loading of the modular transfer unit onto the first vehicle may be sensed and/or registered by the first vehicle, which may store information or data regarding the modular transfer unit, any bins loaded thereon, or contents of such bins in one or more data stores, or transmit the information or data to one or more external systems, e.g., over one or more networks. At box 930, the first vehicle delivers the modular transfer unit to a second station. The second station may be configured for transportation via the same mode of transit as the first station, or via one or more other modes of transit. Positions of the first vehicle, the modular transfer unit and/or the bins or items thereon may be tracked during the delivery of the modular transfer unit, e.g., using one or more position sensing systems provided aboard the first vehicle or the modular transfer unit, or otherwise associated with the bins or items.

At box 935, the modular transfer unit is transferred from the first vehicle to a second vehicle at the second station. For example, referring again to FIGS. 1I through 1K, with the guides 142 aligned with the guides 152, the modular transfer unit 110 is transferred from the trailer 145 to the flat car 150 by the diverter unit 154. Alternatively, a modular transfer unit may be transferred from one vehicle to another vehicle in any other manner. The transfer of the modular transfer unit and/or the bins and items thereon from the first vehicle to the second vehicle may be sensed and/or registered in any manner.

At box 940, the second vehicle delivers the modular transfer unit to a third station. The third station may be configured for transportation via the same mode of transit as the first station or the second station, or via one or more other modes of transit. Positions of the second vehicle, the modular transfer unit and/or the bins or items thereon may be tracked during the delivery of the modular transfer unit, e.g., using one or more position sensing systems provided aboard the second vehicle or the modular transfer unit, or otherwise associated with the bins or items. At box 945, the modular transfer unit is discharged from the second vehicle at the third station, and at box 950, the bin is removed from the modular transfer unit at the third station, e.g., manually or by one or more automated systems. The discharge of the modular transfer unit and/or the bins and items thereon from the second vehicle may be sensed and/or registered in any manner.

At box 955, the bin is delivered from the third station to the destination, and the process ends. Alternatively, the items may be removed from the bin and delivered to one or more destinations, e.g., residences or offices specified in the order, or storage units within a fulfillment center or other like facility. The arrival of the bin and/or any items therein at one or more destinations may be sensed and/or registered in any manner.

Accordingly, the bins and/or modular transfer units may be utilized to deliver one or more items from an origin to a destination in a "packageless" manner, such as by placing the items into a bin at a location of a manufacturer, a merchant, a seller or a vendor, and transporting the bin by way of one or more modular transfer units and/or vehicles to a location associated with the destination, removing the bin from the modular transfer unit or vehicle, and transporting the bin, with the one or more items therein, from the location to the destination.

Although some of the delivery vehicles disclosed herein are depicted as autonomous ground vehicles or tractor-trailers, those of ordinary skill in the pertinent arts will recognize that the systems and methods of the present disclosure are not so limited. Rather, the delivery vehicles of the present disclosure may be any type of vehicle that is configured to transport items from one location (e.g., a fulfillment center or any other type of location) to another location (e.g., a destination specified by a customer in an order for one or more items). The delivery vehicles of the present disclosure may further include any type of vehicles that are configured to transfer items or materials to a human, a machine or another vehicle, or to receive items or materials from a human, a machine or another vehicle, as necessary. Additionally, as is noted above, in some embodiments, the delivery vehicles of the present disclosure may include vehicles that are configured to travel by air, by sea, or across outer space, as well as on land.

Furthermore, although some of the embodiments of the present disclosure depict the delivery of items that are ordered by customers through online marketplaces, those of ordinary skill in the pertinent arts will recognize that the systems and methods of the present disclosure are not so limited. Rather, one or more of the mobile modules disclosed herein, or the systems or methods that rely on such modules, may be used to distribute inventory that may be made available through traditional commercial channels, e.g., by telephone or in one or more bricks-and-mortar stores, and delivered to customers or designated locations rapidly in response to orders for such items. Moreover, although some of the embodiments of the present disclosure depict mobile modules for transporting items or containers of such items are small in size, those of ordinary skill in the pertinent arts will recognize that the systems and methods of the present disclosure are not so limited. Rather, the mobile modules may be of any size or shape, and may be configured or outfitted with features that enable the delivery of items of any type or kind, and of any size or shape, in accordance with the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow chart shown in FIG. 9, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be connected to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A method comprising:
   laterally loading a first bin into a first opening of a first transfer unit at a first location,
   wherein the first bin comprises a first cavity having at least a first item therein, wherein the first transfer unit comprises a first frame and a plurality of openings in a first face of the first frame, wherein each of the plurality of openings is aligned parallel to a lateral axis of the first transfer unit, wherein the first opening is one of the plurality of openings, and wherein at least a first dimension of the first bin corresponds to at least one dimension of the first opening;
   coupling the first transfer unit to a first vehicle at the first location,
   wherein the first transfer unit is coupled to the first vehicle with a longitudinal axis of the first transfer unit aligned with respect to a forward orientation of the first vehicle, and wherein the first vehicle is configured for travel via at least a first transit mode;
   transporting, by at least the first vehicle, the first transfer unit from the first location to a second location via the first transit mode; and
   decoupling the first transfer unit from the first vehicle at the second location.

2. The method of claim 1, wherein the first bin comprises a bottom panel and a plurality of side panels extending vertically upward from the bottom panel,
   wherein the first cavity is defined by the bottom panel and the plurality of side panels,
   wherein each of the side panels has a substantially constant height, and
   wherein each of the bottom panel and the side panels is formed from a common plastic material.

3. The method of claim 2, wherein the first bin further comprises at least one channel associated with at least one of the side panels or the bottom panel,
   wherein the at least one channel extends in parallel to the at least one of the side panels or the bottom panel,
   wherein the first opening further comprises a first guide aligned along or parallel to the lateral axis of the first transfer unit, and
   wherein laterally loading the first bin onto the first transfer unit at the first location comprises:
      aligning the first guide with the at least one channel; and
      inserting the first bin into the first opening with the first guide within the at least one channel.

4. The method of claim 1, wherein decoupling the first transfer unit from the first vehicle at the second location comprises:
   coupling the first transfer unit to a second vehicle at the second location; and
   transporting, by the second vehicle, the first transfer unit from the second location to a third location via a second transmit mode.

5. The method of claim 4, wherein decoupling the first transfer unit from the first vehicle at the second location comprises:
   positioning at least a portion of the first vehicle adjacent to at least a portion of the second vehicle, wherein the first face of the first transfer unit is laterally aligned facing the second vehicle; and
   applying pressure to a second face of the first frame, wherein the second face is opposite the first face,
   wherein the first transfer unit is transferred from the first vehicle to the second vehicle in response to the applied pressure.

6. The method of claim 4, wherein the first transit mode is a first one of by road, by rail or by water, and
   wherein the second transit mode is a second one of by road, by rail or by water.

7. The method of claim 1, wherein the first vehicle comprises a first surface configured to receive one or more modular transfer units thereon,
   wherein coupling the first transfer unit to the first vehicle at the first location comprises:
      positioning at least a portion of the first surface at a first elevation and a first angle, wherein the first angle is approximately horizontal; and
      depositing the first transfer unit on the first surface at the first elevation and the first angle,
   wherein decoupling the first transfer unit from the first vehicle at the second location comprises:
      positioning at least a portion of the first surface at a second elevation and a second angle,
      wherein the second angle is not horizontal, and
      wherein the first transfer unit is decoupled from the first surface by gravity with the first surface positioned at the second elevation and the second angle.

8. The method of claim 1, wherein loading the first bin onto the first transfer unit at the first location comprises:
   placing a first magnetic surface of the first bin in contact with a second magnetic surface of at least one of the first frame or a second bin; and
   energizing at least one of the first magnetic surface or the second magnetic surface at the first location, and
   wherein the method further comprises:
      unloading from the first transfer unit, wherein unloading the first bin from the first transit unit comprises:
         deenergizing at least one of the first magnetic surface or the second magnetic surface at the second location.

9. The method of claim 1, wherein the first bin comprises at least one channel extending substantially parallel to at least one of a side panel or a bottom panel of the first bin, and
   wherein loading the first bin onto the first transfer unit comprises:
      engaging, by an autonomous mobile robot, the first bin by the at least one channel, wherein engaging the first bin comprises inserting at least one extension of the autonomous mobile robot into the at least one channel;
      inserting, by the autonomous mobile robot, the first bin into the first opening of the first transfer unit; and
      disengaging, by the autonomous mobile robot, the first bin within the first opening of the first transfer unit, wherein disengaging the first bin comprises withdrawing the at least one extension of the autonomous mobile robot from the at least one channel.

10. The method of claim 1, further comprising:
    unloading the first bin from the first opening of the first transfer unit at the second location; and
    loading a second bin into the first opening of the first transfer unit at the second location.

11. The method of claim 1, wherein the second location is associated with a fulfillment center, and
    wherein the method further comprises:
       unloading the first bin from the first opening of the first transfer unit at the second location;

removing the first item from the first bin; and storing the first item in a storage unit at the fulfillment center.

12. The method of claim 1, further comprising:

receiving an order for a delivery of a plurality of items to a customer at a third location, wherein the first item is one of the plurality of items;

placing the plurality of items into the first bin at the first location;

removing the first bin from the first transfer unit at the second location; and transporting the first bin from the second location to the third location.

13. The method of claim 1, further comprising:

coupling a second transfer unit to the first vehicle at the second location, wherein the second transfer unit comprises a second frame and a second opening having a second bin loaded in a second face of the second frame, and wherein the second transfer unit is coupled to the first vehicle with the second face in a lateral alignment with respect to the forward orientation of the first vehicle; and transporting, by at least the first vehicle, the second transfer unit from the second location to a third location via the first transit mode.

* * * * *